(12) United States Patent
Stenman et al.

(10) Patent No.: US 12,551,517 B2
(45) Date of Patent: *Feb. 17, 2026

(54) PROBIOTICS FOR COGNITIVE AND MENTAL HEALTH

(71) Applicant: International N&H Denmark Aps, Kongens Lyngby (DK)

(72) Inventors: Lotta Stenman, Kantvik (FI); Markus Lehtinen, Kantvik (FI)

(73) Assignee: INTERNATIONAL N&H DENMARK APS, Kongens Lyngby (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,090

(22) Filed: Sep. 30, 2022

(65) Prior Publication Data

US 2023/0277608 A1 Sep. 7, 2023

Related U.S. Application Data

(63) Continuation of application No. 16/954,590, filed as application No. PCT/EP2018/085469 on Dec. 18, 2018, now abandoned.

(30) Foreign Application Priority Data

Dec. 19, 2017 (EP) .................................. 17208568
Dec. 19, 2017 (GB) .................................. 1721304

(51) Int. Cl.
*A61K 35/747* (2015.01)
*A23L 33/135* (2016.01)
*A61P 25/22* (2006.01)
*A61P 25/24* (2006.01)

(52) U.S. Cl.
CPC .......... *A61K 35/747* (2013.01); *A23L 33/135* (2016.08); *A61P 25/22* (2018.01); *A61P 25/24* (2018.01); *A23V 2400/165* (2023.08); *A23V 2400/169* (2023.08)

(58) Field of Classification Search
CPC . A61K 35/747; A61K 2300/00; A23L 33/135; A61P 25/22; A61P 25/24; A61P 1/00; A61P 1/04; A61P 1/12; A61P 25/00; A61P 25/28; A61P 25/18; A23V 2400/165; A23V 2400/169; A23V 2002/00; A23V 2200/32; A23V 2200/3204; A23V 2200/322

See application file for complete search history.

(56) References Cited

U.S. PATENT DOCUMENTS

| | | | |
|---|---|---|---|
| 2007/0149577 A1* | 6/2007 | Hamilton | C07D 333/34 546/268.1 |
| 2007/0280909 A1* | 12/2007 | Tournade | A23D 7/0053 435/253.4 |
| 2008/0175865 A1* | 7/2008 | Varga | A61K 35/747 424/234.1 |
| 2011/0280837 A1* | 11/2011 | Bergonzelli | A61P 43/00 424/93.3 |
| 2012/0009154 A1 | 1/2012 | Porubcan et al. | |
| 2014/0242050 A1 | 8/2014 | Bergonzelli Degonda et al. | |
| 2016/0114024 A1* | 4/2016 | Tanaka | A23K 10/12 435/252.9 |
| 2017/0312232 A1 | 11/2017 | Vitetta et al. | |
| 2025/0032560 A1 | 1/2025 | Stenman et al. | |

FOREIGN PATENT DOCUMENTS

| | | | | |
|---|---|---|---|---|
| EP | 2937424 A1 * | 10/2015 | ........... | A23L 33/135 |
| EP | 2937424 B1 | 10/2015 | | |
| JP | 2009-102292 A | 4/2009 | | |
| WO | 2005077391 A1 | 8/2005 | | |
| WO | 2012089784 A1 | 7/2012 | | |
| WO | 2012/126481 A1 | 9/2012 | | |
| WO | WO-2016065419 A1 * | 5/2016 | ............... | A23L 2/52 |
| WO | 2017/047777 A1 | 3/2017 | | |
| WO | 2017064244 A1 | 4/2017 | | |
| WO | 2018/002238 A1 | 1/2018 | | |
| WO | WO-2018073963 A1 * | 4/2018 | ............... | A23L 2/00 |
| WO | 2019/119261 A1 | 6/2019 | | |
| WO | 2019/121666 A1 | 6/2019 | | |
| WO | 2020/225207 A1 | 11/2020 | | |

OTHER PUBLICATIONS

Albee, GW et al. Mental illness is not "an illness like any other." Journal of Primary Prevention. 2004. 24(4): 419-436. (Year: 2004).*
WO 2018/073963. Machine Translation. Published Apr. 26, 2018. (Year: 2018).*
Huiying Wang: "Effects of probiotics on central nervous system functions in humans" Dissertation zur Erlangung des Grades eines Doktors der Naturwissenschaften der Mathematisch-Naturwissenschaftlichen Fakultät und der Medizinischen Fakultät der Eberhard-Karls-Universität TUbingen, XP055478554, Dec. 1, 2017 (Dec. 1, 2017), Retrieved from the Internet: U RL:httpszllpublikationen.unituebingen.de/xmlui/bitstream/handle/1 0900/801 25/PhDThesis% 20final_Wang.pdf sequence=2 [retrieved on May 25, 2018].
Liu Yen-Wenn et al: "Psychotropic effects of Lactobacillus plantarumPS128 in early life-stressed and naïve adult mice", Brain REsearch, Elsevier, Amsterdam, NL, vol. 1631, Nov. 24, 2015 (Nov. 24, 2015), pp. 1-12, XP029396287, ISSN: 0006-8993, DOI: 10.101 6/J.BRAINRES.201 5.11.018.
Meng-Chun Cheng et al: "Prevention of hypertension-induced vascular dementia by Lactobacillus paracasei subsp. paracasei NTU 101-fermented products", Pharmaceutical Biology, vol. 55, no. 1, Dec. 9, 2016 (Dec, 9, 2016), pp. 487-496, XP055509070,NL ISSN: 1 388-0209, DOI: 10.1080/138802092016.1253109.

(Continued)

*Primary Examiner* — David W Berke-Schlessel
*Assistant Examiner* — Susan E. Fernandez

(57) ABSTRACT

The invention relates to bacteria of the species *Lactobacillus paracasei* and/or compositions comprising *Lactobacillus paracasei* for use in preventing and/or treating a mental illness, a symptom affecting mental health and/or a condition associated with chronic stress, in a mammal. The invention further relates to methods and uses of said bacteria of the species *Lactobacillus paracasei* and/or compositions. The invention can be applied in restoring, maintaining, and/or promoting mental (including cognitive) health and has potential applications, inter alia, in the area of dietary and food supplements, medicaments and pharmaceuticals.

13 Claims, 13 Drawing Sheets

(56) References Cited

OTHER PUBLICATIONS

Chunchai Titikorn et al: "Prebiotics Probiotics or Synbiotics Therapy Restores Cognitive Decline in Obese Rats"Alzheimer's & Dementia: The Journal Of The Alzheimer'sAssociation, vol. 13, No. 7, XP08521 7651, ISSN: 1 552-5260, DOI: 10.101 6/J.JALZ.201 7.06.1892.

Fengwei Tian et al: "The therapeutic protection of a living and dead Lactobacillus strain against aluminum-induced brain and liver injuries in CS7BL/6 mice", PLOS ONE, vol. 12, No. 4, Apr. 7, 2017 (Apr. 7, 2017), p. 1-16, 75398, XP055508537, DOI: 10.1371/journal.pone.01 75398.

Fengwei Tian et al: "Protective Effects of Lactobacillus plantarum CCFM8246 against Copper Toxicity in Mice", PLOS ONE, vol. 10, No. 11, Nov. 25, 2015 (Nov. 25, 2015), p. eOI 4331 8, XP055509196, DOI: 10.1371/journal.pone.0143318.

Lutgendorff Femke et al: "The role of microbiota and probiotics in stress-induced gastrointestinal damage", Current Molecular Medicine, Bentham Science Publishers, NL, vol. 8, No. 4, Jun. 1, 2008 (Jun. 1, 2008), pp. 282-298, XP0091 50148, ISSN: 1566-5240.

Eutamene H et al: "Synergy between Lactobacillus paracasei and its bacterial products to counteract stress-induced gut permeability and sensitivity increase in rats", The Journal of Nutri, American Society For Nutrition, US, vol. 137, No. 8, Jan. 1, 2007 (Jan. 1, 2007), pp. 1901-1907, XP008096506, ISSN: 0022-31 66.

\* cited by examiner

PROBIOTICS FOR COGNITIVE AND MENTAL HEALTH

CROSS REFERENCE TO RELATED PATENT APPLICATIONS

This patent claims priority as a continuation under 35 USC § 120 to U.S. patent application Ser. No. 16/954,590 (filed Jun. 17, 2020), which, in turn, claims priority under 35 USC § 371 as a national phase of Int'l Patent Appl. PCT/EP2018/085469 (filed Dec. 18, 2018; and published Jun. 27, 2019 as Int'l Publ. No. WO2019/121666), which, in turn, claims priority to European Patent Appl. No. 17208568.0 (filed Dec. 19, 2017) and United Kingdom Patent Appl. No. 1721304.2 (filed Dec. 19, 2017). The entire text of each of the above-referenced patent applications is incorporated by reference into this specification.

FIELD OF THE INVENTION

This invention relates to bacteria of the species *Lactobacillus paracasei* and/or compositions comprising *Lactobacillus paracasei* for use in preventing and/or treating mental illness, symptoms affecting mental health and/or conditions associated with chronic stress, in a mammal. In particular, this invention relates to bacteria of the species *Lactobacillus paracasei* and/or compositions comprising *Lactobacillus paracasei* for prevention and/or treatment of chronic or acute stress-related mental illness characterised, for example, by psychological symptoms of depression, anxiety, perceived stress, deficits in cognitive function and dementia. This invention also relates to methods and uses of bacteria of the species *Lactobacillus paracasei* and/or compositions comprising *Lactobacillus paracasei*, including food products, dietary supplements, and pharmaceutically acceptable formulations/compositions.

BACKGROUND

Mental health is related to emotional, psychological, physical and social well-being. Our mental health status determines how we handle stress. A mental illness can be defined as a health condition that changes a person's thinking, feelings, or behaviour (or all three) and that causes the person distress and problems functioning in social, work or family activities. Mental illness encompasses a wide range of disorders related to anxiety, mood, psychosis, eating behaviour, impulse control and addiction, personality, sociability, dissociation, obsessive-compulsive and post-traumatic stress. Each illness alters a person's thoughts, feelings, and/or behaviours in distinct ways. Disorders such as Parkinson's disease, epilepsy and multiple sclerosis are brain disorders but they are considered neurological diseases rather than mental illness. Interestingly, the lines between mental illness and neurological diseases, including memory disorders such as mild cognitive impairment, dementia and Alzheimer's disease, are not clearly defined and increasing evidence now suggests that mental illness is associated with changes in the brain's structure, chemistry and function which could underlie the development of neurological disorders. For example, the link between neurocognitive deficits and mood disorders is well established such that in major depression, cognitive impairment can mimic that observed in dementia (Rabins et al. Br J Psychiatry 1984; 144: 488-92).

Furthermore, untreated chronic stress can result in serious health conditions such as anxiety, muscle pain, high blood pressure and a weakened immune system. Research shows that stress can contribute to the development of major illnesses, such as heart disease, depression and obesity. Symptoms of acute and chronic stress can manifest in the gastrointestinal tract, causing short- and long-term effects on the functions of the gastrointestinal tract, respectively. Exposure to stress results in alterations within the brain-gut axis, ultimately leading to the development of a broad array of gastrointestinal disorders including inflammatory bowel disease (IBD), irritable bowel syndrome (IBS) and other functional gastrointestinal diseases, food antigen-related adverse responses, peptic ulcers and gastroesophageal reflux disease (GERD). The major effects of stress on gut physiology include: 1) alterations in gastrointestinal motility; 2) increase in visceral perception; 3) changes in gastrointestinal secretion; 4) increase in intestinal permeability; 5) negative effects on regenerative capacity of gastrointestinal mucosa and mucosal blood flow; and 6) alteration in gut microbial composition (Konturek et al. J. Physiol Pharmacol. 2011; 62(6):591-9).

With respect to mental illness and associated neurocognitive decline and neurological disorders, there is now a clear emphasis on strategies to achieve positive mental and cognitive health for a full and healthy life. There is an increase in demand for nutritional therapies to achieve positive mental health, with no side effects. Current medication to treat mental illnesses symptoms affecting mental health have many negative side effects such as nausea, increased appetite and weight gain, fatigue and gastrointestinal symptoms. Dietary supplements may represent an attractive means of achieving positive mental health and preventing symptoms of mental illness and related conditions from developing.

The gut-brain axis describes the bidirectional communication that exists between the brain and the gut and the microbiota-gut-brain axis supports the role of the gut microbiome in this communication system. As outlined above, mental illness and symptoms affecting mental health are comorbid with gastrointestinal disorders whereby emotional and routine daily life stress can disrupt digestive function and vice versa. Increasing evidence indicates that the gut microbiota exerts a profound influence on brain physiology, psychological responses and ultimately behaviour (Dinan et al. J. Psychiatr Res. 2015; 63: 1-9). Emerging evidence suggests that probiotics can influence central nervous system function and regulate mood, psychological symptoms such as anxiety and depression and stress-related changes in physiology, behaviour and brain function.

OBJECT OF INVENTION

It is an object of the present invention to provide means for preventing and/or treating a mental illness, a symptom affecting mental health and/or treating a condition associated with chronic stress. It is therefore an object of the invention to provide means by which an individual's mental health can be promoted, maintained, and/or restored.

SUMMARY OF THE INVENTION

The present invention is based on studies described herein which surprisingly demonstrate that *Lactobacillus paracasei* can significantly counteract the effects of stress on behavioural (anxiety, depression and cognitive function), biochemical and functional outcomes.

Accordingly, in one aspect, the invention provides bacteria of the species *Lactobacillus paracasei* for use in preventing and/or treating a mental illness, a symptom affecting mental health and/or a condition associated with chronic stress, in a mammal.

In another aspect, the invention provides a composition comprising *Lactobacillus paracasei* for use in preventing and/or treating a mental illness, a symptom affecting mental health and/or a condition associated with chronic stress, in a mammal.

In another aspect, the invention provides a method for preventing and/or treating a mental illness, a symptom affecting mental health and/or a condition associated with chronic stress, in a mammal, comprising administering to the mammal bacteria of the species *Lactobacillus paracasei*.

In another aspect, the invention provides a method for preventing and/or treating a mental illness, a symptom affecting mental health and/or a condition associated with chronic stress, in a mammal, comprising administering to the mammal a composition comprising *Lactobacillus paracasei*.

In another aspect, the invention provides the use of bacteria of the species *Lactobacillus paracasei* for the manufacture of a medicament for preventing and/or treating a mental illness, a symptom affecting mental health and/or a condition associated with chronic stress, in a mammal.

In yet a further aspect, the invention provides the use of a composition comprising *Lactobacillus paracasei* for the manufacture of a medicament for preventing and/or treating a mental illness, a symptom affecting mental health and/or a condition associated with chronic stress, in a mammal.

In another aspect, the invention provides a *Lactobacillus paracasei* strain for use in preventing and/or treating a mental illness, a symptom affecting mental health and/or a condition associated with chronic stress, in a mammal.

In a further aspect, the invention provides a composition comprising *Lactobacillus paracasei* and *Lactobacillus plantarum* for use in preventing and/or treating a mental illness, a symptom affecting mental health and/or a condition associated with chronic stress, in a mammal.

In yet a further aspect, the invention provides a combination of *Lactobacillus paracasei* and *Lactobacillus plantarum*, for separate, sequential, or simultaneous use in preventing and/or treating a mental illness, a symptom affecting mental health and/or condition associated with chronic stress, in a mammal.

In another aspect, the invention provides a method for treating and/or preventing a mental illness, a symptom affecting mental health and/or a condition associated with chronic stress, in a mammal, comprising the separate, sequential, or simultaneous administering to the mammal, of at least one strain of *Lactobacillus paracasei* and at least one strain of *Lactobacillus plantarum*.

The *Lactobacillus paracasei* used in aspects of the invention is optionally strain Lpc-37, registered at the DSMZ under deposit number DSM 32661.

Also, optionally, when used in aspects of the invention, the *Lactobacillus plantarum* is *Lactobacillus plantarum* strain LP12418, deposited as at the DSMZ as DSM 32655, and/or *Lactobacillus plantarum* strain LP12407, deposited at the DSMZ as DSM32655.

DETAILED DESCRIPTION OF INVENTION

Bacteria

Figure 1:
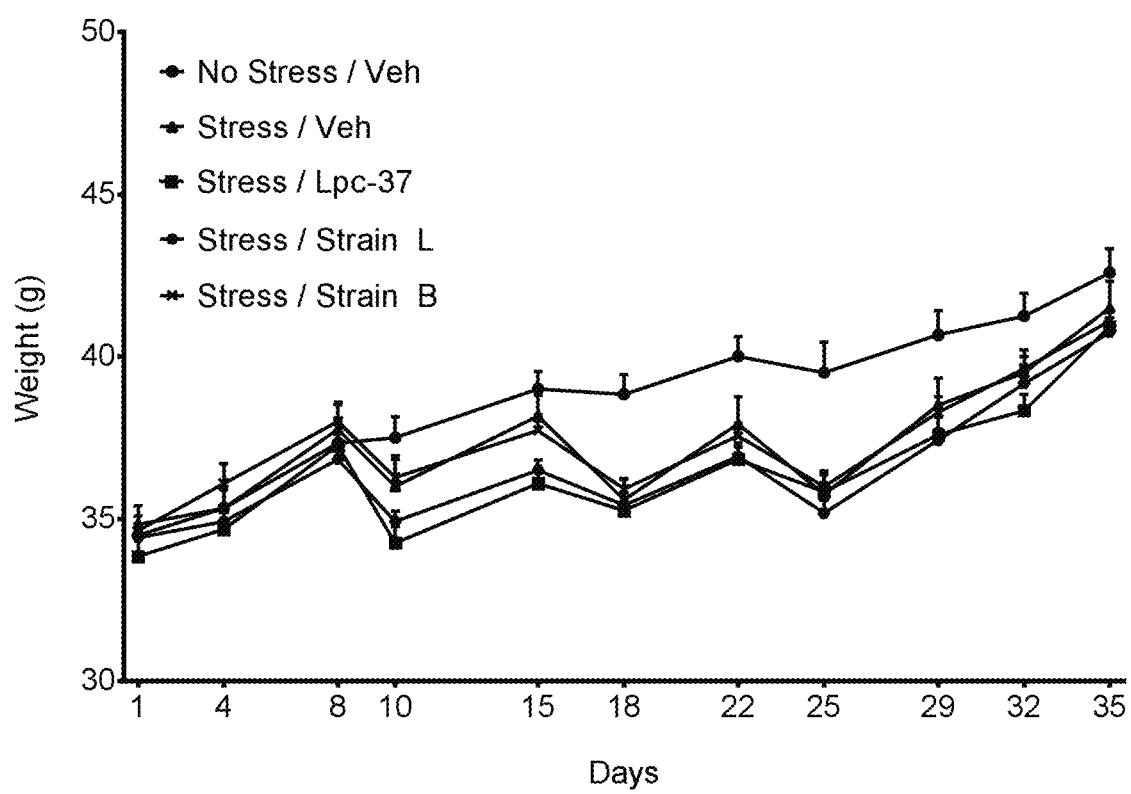
FIG. 1. Effect of 3 weeks of chronic stress on body weight in mice, in groups treated with vehicle alone or a selected bacterial strain. N=12 for all groups except for group treated with Lpc-37 where N=11. Statistical Analyses: Two-way ANOVA; Weight (time): $F_{(10,594)}$=60.99, p<0.0001; Weight (treatment): $F_{(4,594)}$=29.30, p<0.0001

The bacteria used in aspects of the invention are bacteria of the species *Lactobacillus paracasei*. Optionally, the *Lactobacillus paracasei* is strain Lpc-37, also known as DGCC4981 or Lbc81. Strain Lpc-37 is registered at the ATCC under deposit number PTA 4798 and at the DSMZ (Leibniz-Institut DSMZ-Deutsche Sammlung von Mikroorganismen and Zellkulturen GmbH, Inhoffenstr. 7B D-38124) under deposit number DSM32661, on 5 Oct. 2017. A copy of the DSMZ deposit form for Lpc-37 giving relevant information on the characteristics of the strain, is incorporated herein.

The *Lactobacillus paracasei* may be used in combination with one or more strains of *Lactobacillus plantarum*. Optionally, the *Lactobacillus plantarum* strain or strains are selected from the following:

Lactobacillus plantarum stain LP12418, deposited with the DSMZ under deposit number DSM 32655, on 27 Sep. 2017;

Lactobacillus plantarum strain LP12407, deposited with the DSMZ under deposit number DSM 32654, on 27 Sep. 2017

Copies of the DSMZ deposit forms for LP12418 and LP12407 giving relevant information on the characteristics of the strains, are incorporated herein (LP12418 is referred to as DGCC12418 and LP12407 is referred to as DGCC12407).

The *Lactobacillus paracasei* may also be used in combination with one or more other bacterial species which have the ability to exert positive health benefits on a host to which they are administered.

The *Lactobacillus paracasei* may be used in any form (for example viable, dormant, inactivated or dead bacteria) provided that the bacteria remain capable of exerting the effects described herein. Preferably, the *Lactobacillus paracasei* used in aspects of the invention is viable.

Preferably, the *Lactobacillus paracasei* and, when used in aspects of the invention, the *Lactobacillus plantarum*, is suitable for human and/or animal consumption. A skilled person will be readily aware of specific strains of *Lactobacillus paracasei* and *Lactobacillus plantarum* which are used in the food and/or agricultural industries and which are generally considered suitable for human and/or animal consumption.

Optionally, the *Lactobacillus paracasei* and, when used in aspects of the invention, the *Lactobacillus plantarum*, are probiotic bacteria. The term "probiotic bacteria" is defined as covering any non-pathogenic bacteria which, when administered live in adequate amounts to a host, confer a health benefit on that host. For classification as a "probiotic", the bacteria must survive passage through the upper part of the digestive tract of the host. They are non-pathogenic, non-toxic and exercise their beneficial effect on health on the one hand via ecological interactions with the resident flora in the digestive tract, and on the other hand via their ability to influence the host physiology and immune system in a positive manner. Probiotic bacteria, when administered to a host in sufficient number, have the ability to progress through the intestine, maintaining viability, exerting their primary effects in the lumen and/or the wall of the host's gastrointestinal tract. They then transiently form part of the resident flora and this colonisation (or transient colonisation) allows the probiotic bacteria to exercise a beneficial effect, such as the repression of potentially pathogenic micro-organisms present in the flora and interactions with the host in the intestine including the immune system.

Optionally the *Lactobacillus paracasei* is used in combination with other probiotic bacteria.

Compositions

The term "composition" is used in the broad sense to mean the manner in which something is composed, i.e. its general makeup. In aspects of the invention, the compositions may consist essentially of a single strain of *Lactobacillus paracasei* bacteria (e.g. ATCC PTA 4798/DSM 32661).

Alternatively, the compositions may comprise a *Lactobacillus paracasei* strain together with other components, such as other bacterial strains, biological and chemical components, active ingredients, metabolites, nutrients, fibres, prebiotics, etc.

In one example, the compositions used in aspects of the invention consist essentially of a *Lactobacillus paracasei* strain (e.g. ATCC PTA 4798/DSM 32661) or a mixture of a *Lactobacillus paracasei* strain (e.g. ATCC PTA 4798/DSM 32661) and other bacterial strains.

While it is not a requirement that the compositions comprise any support, diluent or excipient, such a support, diluent or excipient may be added and used in a manner which is familiar to those skilled in the art. Examples of suitable excipients include, but are not limited to, microcrystalline cellulose, rice maltodextrin, silicone dioxide, and magnesium stearate. The compositions of the invention may also comprise cryoprotectant components (for example, glucose, sucrose, lactose, trehalose, sodium ascorbate and/or other suitable cryoprotectants).

The terms "composition" and "formulation" may be used interchangeably.

Compositions used in aspects of the invention may take the form of solid, solution or suspension preparations. Examples of solid preparations include, but are not limited to: tablets, pills, capsules, granules and powders which may be wettable, spray-dried or freeze dried/lyophilized. The compositions may contain flavouring or colouring agents. The compositions may be formulated for immediate-, delayed-, modified-, sustained-, pulsed- or controlled-release applications.

By way of example, if the compositions of the present invention are used in a tablet form, the tablets may also contain one or more of: excipients such as microcrystalline cellulose, lactose, sodium citrate, calcium carbonate, dibasic calcium phosphate and glycine; disintegrants such as starch (preferably corn, potato or tapioca starch), sodium starch glycollate, croscarmellose sodium and certain complex silicates; granulation binders such as polyvinylpyrrolidone, hydroxypropylmethylcellulose (HPMC), hydroxypropylcellulose (HPC), sucrose, gelatin and acacia; lubricating agents such as magnesium stearate, stearic acid, glyceryl behenate and talc may be included.

Examples of other acceptable carriers for use in preparing compositions include, for example, water, salt solutions, alcohol, silicone, waxes, petroleum jelly, vegetable oils, polyethylene glycols, propylene glycol, liposomes, sugars, gelatin, lactose, amylose, magnesium stearate, talc, surfactants, silicic acid, viscous paraffin, perfume oil, fatty acid monoglycerides and diglycerides, hydroxymethylcellulose, polyvinylpyrrolidone, and the like.

For aqueous suspensions and/or elixirs, the composition of the present invention may be combined with various sweetening or flavouring agents, colouring matter or dyes, with emulsifying and/or suspending agents and with diluents such as water, propylene glycol and glycerin, and combinations thereof.

Specific non-limiting examples of compositions which can be used in aspects of the invention are set out below for illustrative purposes. These include, but are not limited to food products, functional foods, dietary supplements, pharmaceutical compositions and medicaments.

Dietary Supplements

The compositions of the invention may take the form of dietary supplements or may themselves be used in combination with dietary supplements, also referred to herein as food supplements.

The term "dietary supplement" as used herein refers to a product intended for ingestion that contains a "dietary ingredient" intended to add nutritional value or health benefits to (supplement) the diet. A "dietary ingredient" may include (but is not limited to) one, or any combination, of the following substances: bacteria, a probiotic (e.g. probiotic bacteria), a vitamin, a mineral, a herb or other botanical, an amino acid, a dietary substance for use by people to supplement the diet by increasing the total dietary intake, a concentrate, metabolite, constituent, or extract.

Dietary supplements may be found in many forms such as tablets, capsules, soft gels, gel caps, liquids, or powders. Some dietary supplements can help ensure an adequate dietary intake of essential nutrients; others may help reduce risk of disease.

Food Products

The compositions of the invention may take the form of a food product. Here, the term "food" is used in a broad sense and covers food and drink for humans as well as food and drink for animals (i.e. a feed). Preferably, the food product is suitable for, and designed for, human consumption.

The food may be in the form of a liquid, solid or suspension, depending on the use and/or the mode of application and/or the mode of administration.

When in the form of a food product, the composition may comprise or be used in conjunction with one or more of: a nutritionally acceptable carrier, a nutritionally acceptable diluent, a nutritionally acceptable excipient, a nutritionally acceptable adjuvant, a nutritionally active ingredient.

By way of example, the compositions of the invention may take the form of one of the following:

A fruit juice; a beverage comprising whey protein: a health or herbal tea, a cocoa drink, a milk drink, a lactic acid bacteria drink, a yoghurt and/or a drinking yoghurt, a cheese, an ice cream, a water ice, a desserts, a confectionery, a biscuit, a cake, cake mix or cake filling, a snack food, a fruit filling, a cake or doughnut icing, an instant bakery filling cream, a filling for cookies, a ready-to-use bakery filling, a reduced calorie filling, an adult nutritional beverage, an acidified soy/juice beverage, a nutritional or health bar, a beverage powder, a calcium fortified soy milk, or a calcium fortified coffee beverage.

Optionally, where the product is a food product, the *Lactobacillus paracasei* should remain effective through the normal "sell-by" or "expiration" date during which the food product is offered for sale by the retailer. Preferably, the effective time should extend past such dates until the end of the normal freshness period when food spoilage becomes apparent. The desired lengths of time and normal shelf life will vary from foodstuff to foodstuff and those of ordinary skill in the art will recognise that shelf-life times will vary upon the type of foodstuff, the size of the foodstuff, storage temperatures, processing conditions, packaging material and packaging equipment.

Food Ingredients

Compositions of the present invention may take the form of a food ingredient and/or feed ingredient.

As used herein the term "food ingredient" or "feed ingredient" includes a composition which is or can be added to functional foods or foodstuffs as a nutritional and/or health supplement for humans and animals.

The food ingredient may be in the form of a liquid, suspension or solid, depending on the use and/or the mode of application and/or the mode of administration.

Functional Foods

Compositions of the invention may take the form of functional foods.

As used herein, the term "functional food" means food which is capable of providing not only a nutritional effect, but is also capable of delivering a further beneficial effect to the consumer.

Accordingly, functional foods are ordinary foods that have components or ingredients (such as those described herein) incorporated into them that impart to the food a specific function—e.g. medical or physiological benefit—other than a purely nutritional effect.

Although there is no legal definition of a functional food, most of the parties with an interest in this area agree that they are foods marketed as having specific health effects beyond basic nutritional effects.

Some functional foods are nutraceuticals. Here, the term "nutraceutical" means a food which is capable of providing not only a nutritional effect and/or a taste satisfaction, but is also capable of delivering a therapeutic (or other beneficial) effect to the consumer. Nutraceuticals cross the traditional dividing lines between foods and medicine.

Medical Foods

Compositions of the present invention may take the form of medical foods.

By "medical food" it is meant a food which is formulated to be consumed or administered with or without the supervision of a physician and which is intended for a specific dietary management or condition for which distinctive nutritional requirements, based on recognized scientific principles, are established by medical evaluation.

Pharmaceutical Compositions

Compositions of the invention may be used as—or in the preparation of—pharmaceuticals. Here, the term "pharmaceutical" is used in a broad sense—and covers pharmaceuticals for humans as well as pharmaceuticals for animals (i.e. veterinary applications). In a preferred aspect, the pharmaceutical is for human use.

The pharmaceutical can be for therapeutic purposes—which may be curative or palliative or preventative in nature.

A pharmaceutical may be in the form of a compressed tablet, tablet, capsule, ointment, suppository or drinkable solution.

When used as—or in the preparation of—a pharmaceutical, the compositions of the present invention may be used in conjunction with one or more of: a pharmaceutically acceptable carrier, a pharmaceutically acceptable diluent, a pharmaceutically acceptable excipient, a pharmaceutically acceptable adjuvant, a pharmaceutically active ingredient.

The pharmaceutical may be in the form of a liquid or as a solid—depending on the use and/or the mode of application and/or the mode of administration.

The *Lactobacillus paracasei* used in the present invention may itself constitute a pharmaceutically active ingredient. In one embodiment, the *Lactobacillus paracasei* constitutes the sole active component. Alternatively, the *Lactobacillus paracasei* may be at least one of a number (i.e. 2 or more) of pharmaceutically active components.

Medicaments

Compositions of the invention may take the form of medicaments.

The term "medicament" as used herein encompasses medicaments for both human and animal usage in human and veterinary medicine. In addition, the term "medicament" as used herein means any substance which provides a therapeutic, preventative and/or beneficial effect. The term "medicament" as used herein is not necessarily limited to substances which need Marketing Approval, but may include substances which can be used in cosmetics, nutraceuticals, food (including feeds and beverages for example), probiotic cultures, and natural remedies. In addition, the term "medicament" as used herein encompasses a product designed for incorporation in animal feed, for example livestock feed and/or pet food.

Dosage

The compositions of the present invention may comprise from $10^6$ to $10^{12}$ colony forming units (CFU) of *Lactobacillus paracasei* bacteria per dose or per gram of composition, and more particularly from $10^8$ to $10^{12}$ CFU of *Lactobacillus paracasei* bacteria per dose or per gram of composition. Optionally the compositions comprise about $10^{10}$ CFU *Lactobacillus paracasei* per dose or per gram of composition.

The *Lactobacillus paracasei* may be administered at a dosage of from about $10^6$ to about $10^{12}$ CFU of bacteria per dose, preferably about $10^8$ to about $10^{12}$ CFU of bacteria per dose. By the term "per dose" it is meant that this amount of bacteria is provided to a subject either per day or per intake, preferably per day. For example, if the bacteria are to be administered in a food product, for example in a yoghurt, then the yoghurt may contain from about $10^6$ to $10^{12}$ CFU of *Lactobacillus paracasei*. Alternatively, however, this amount of bacteria may be split into multiple administrations, each consisting of a smaller amount of microbial loading—so long as the overall amount of *Lactobacillus paracasei* received by the subject in any specific time, for instance each 24-hour period, is from about $10^6$ to about $101^2$ CFU of bacteria, optionally $10^8$ to about $10^{12}$ CFU of bacteria.

In accordance with the present invention an effective amount of at least one strain of a *Lactobacillus paracasei* may be at least $10^6$ CFU of bacteria/dose, optionally from about $10^8$ to about $10^{12}$ CFU of bacteria/dose, e.g., about $10^{10}$ CFU of bacteria/dose.

In one embodiment, the *Lactobacillus paracasei* (e.g. ATCC PTA-4798/DSM 32661), may be administered at a dosage of from about $10^6$ to about $10^{12}$ CFU of bacteria/day, optionally about $10^8$ to about $10^{12}$ CFU of bacteria/day. Hence, the effective amount in this embodiment may be from about $10^6$ to about $10^{12}$ CFU of bacteria/day, optionally about $10^8$ to about $10^{12}$ CFU of bacteria/day.

Effects/Subjects/Medical Indications

The compositions of the present invention can be used for administration to a mammal, including for example livestock (including cattle, horses, pigs, and sheep), and humans. In some embodiments of the present invention, the mammal is a companion animal (including pets), such as a dog or a cat for instance. In preferred embodiments, the compositions are for use in a human.

The compositions of the present invention can be used for the prevention and/or treatment of a mental illness, a symptom affecting mental health and/or a condition associated with chronic stress, such as for example, neurological and gastrointestinal disorders.

The term "mental illness" can be defined as a health condition that changes a person's thinking, feelings, or behaviour (or all three) and that causes the person distress and problems functioning in social, work or family activities. Mental illness encompasses a wide range of disorders related to anxiety, mood, psychosis, eating behaviour, impulse control and addiction, personality, sociability, dissociation, obsessive-compulsive and post-traumatic stress. Each illness alters a person's thoughts, feelings, and/or behaviours in distinct ways. As used herein, mental illness also includes neurological disorders and conditions related to mental illness which may be a cause or symptom of a mental illness or be a condition that can increase the chance of one developing.

Disorders associated with anxiety are categorised under "mental illness". The term "anxiety disorder" refers to a specific mental illness that involves extreme fear or worry, and includes generalized anxiety disorder (GAD), panic disorder and panic attacks, agoraphobia, social anxiety disorder, selective mutism, separation anxiety, and specific phobias. Obsessive-compulsive disorder (OCD) and post-traumatic stress disorder (PTSD) are closely related to anxiety disorders, which some may experience at the same time as depression. GAD represents more than the normal level of anxiety individuals experience from day to day and is characterised by chronic worry and tension. Compositions of the invention can be used to treat and/or prevent recognised anxiety disorders as well as symptoms of anxiety more generally.

As used herein, mental illness also includes associated neurological disorders, including memory disorders, mild cognitive impairment, dementia and Alzheimer's disease. Cognition denotes a relatively high level of processing of specific information including thinking, memory, perception, motivation, skilled movements and language. Cognitive disorders are defined as those with "a significant impairment of cognition or memory that represents a marked deterioration from a previous level of function" (Guerrero, Anthony (2008). Problem-Based Behavioural Science of Medicine. New York: Springer. pp. 367-79). They can be categorised into three main areas: (1) Delirium, a disorder affecting situational awareness and processing of new information; (2) Dementia, a disorder which can erase all or parts of an individual's memory; and (3) Amnesia, a disorder in which the individual afflicted has trouble retaining long term memories.

The compositions of the invention can be used to promote, restore and/or maintain an individual's mental health, such as to prevent mental illness or any associated disorders and/or symptoms affecting an individual's mental health.

Symptoms affecting mental health include; feeling sad or down, confused thinking or reduced ability to concentrate, excessive fears or worries, or extreme feelings of guilt, extreme mood changes of highs and lows, withdrawal from friends and activities, detachment from reality, paranoia or hallucinations, inability to cope with daily problems or stress, trouble understanding and relating to situations and to people, alcohol or drug abuse, major changes in eating habits, sex drive changes, excessive anger, hostility or violence and suicidal thoughts.

For the purposes of the present invention, mental illness and symptoms affecting mental health, also encompass conditions affecting an individual's cognitive function. Such conditions may include or overlap with various cognitive disorders. Examples include, but are not limited to, agnosia, amnesia, dementia, Alzheimer's disease, Parkinson's disease, and chronic stress, which has been shown to negatively affect brain function.

Intense acute and chronic stress can negatively impact both physical and mental health, increasing risk of developing mental illness. For example, chronic stress has been correlated with the development of mood disorders, anxiety disorders and depression. The compositions of the invention can be used to prevent and/or treat a mental illness or symptoms affecting mental health, resulting from chronic or acute stress.

The compositions of the invention can also be used to treat and/or prevent other (including physical) conditions associated with chronic or acute stress. For example, in one embodiment, the compositions of the invention are used to treat and/or prevent gastrointestinal disorders, for example, IBS, associated with chronic or acute stress. By addressing the symptoms of mental illness associated with gastrointestinal disorders, it is possible that such treatment may have a beneficial effect on the gastrointestinal disorders themselves.

More generally, the compositions of the invention can be used for the prevention and/or treatment of one or more of the mental illnesses, symptoms affecting mental health and/or conditions associated with chronic or intense acute stress as set out above.

In particular embodiments, the compositions of the invention can be used for the prevention and/or treatment of anxiety, depression, and/or diminished cognitive function.

When compositions of the invention are used for the prevention of a mental illness or a symptom affecting mental health, they can be used for maintaining a normal level of mental health in an already healthy individual. Alternatively, when compositions of the invention are used to treat a mental illness or symptom affecting mental health, they can be used for restoring or partially restoring a normal level of mental health in an individual suffering from the mental illness or symptom in question.

Methods, Uses and Other Embodiments of the Invention

As set out above, one aspect of the invention provides a method for preventing and/or a treating a mental illness, a symptom affecting mental health or a condition associated with chronic stress, in a mammal, comprising administering to the mammal a composition comprising *Lactobacillus paracasei*.

In yet a further aspect, the invention provides for the use of a composition comprising *Lactobacillus paracasei* for the manufacture of a medicament for preventing and/or treating a mental illness, a symptom affecting mental health or a condition associated with chronic stress, in a mammal.

For the avoidance of doubt, any of the compositions described herein and set out above can be utilised in the methods and use aspects of the invention. For example, further embodiments include, but are not limited to, those set out below:

Embodiment 1: A method for preventing and/or treating mental illness, a mental illness, a symptom affecting mental health or a condition associated with chronic stress, in a mammal, comprising administering to the mammal a composition comprising *Lactobacillus paracasei*.

Embodiment 2: A method as in embodiment 1, wherein the composition consists essentially of *Lactobacillus paracasei*.

Embodiment 3: A method as in embodiment 1 or 2, wherein the composition further comprises *Lactobacillus plantarum*.

Embodiment 4: A method as in any of embodiments 1 to 3, wherein the *Lactobacillus paracasei* is strain Lpc-37 registered at the DSMZ under deposit number DSM 32661.

Embodiment 5: A method as in any of embodiments 1 to 4, for preventing or counteracting chronic stress-induced increases in plasma corticosterone or cortisol concentration.

Embodiment 6: A method as in any of embodiments 1 to 5, wherein the mental illness is a mood disorder, an anxiety disorder and/or depression.

Embodiment 7: A method as in any of embodiments 1 to 6, wherein the symptom affecting mental health is anxiety/mood swings and/or depression.

Embodiment 8: A method as in any of embodiments 1 to 7, wherein the mental illness is a disorder resulting in diminished cognitive function.

Embodiment 9: A method as in any of embodiments 1 to 8, wherein the condition associated with chronic stress is a gastrointestinal disorder, e.g. IBS.

Embodiment 10: A method as in any of embodiments 1 to 9, wherein the composition is orally administered.

Embodiment 11: A method as in any of embodiments 1 to 10, wherein the composition is in the form of a food product, a dietary supplement, or a pharmaceutically acceptable composition.

Embodiment 12: A method as in any of embodiments 1 to 11, wherein the composition is a spray dried or freeze-dried composition.

Embodiment 13: A method as in embodiment 12, wherein the composition comprises a cryoprotectant.

Embodiment 14: A method as in any of embodiments 1 to 13, wherein the *Lactobacillus paracasei* is present in the composition in an amount between $10^6$ and $10^{12}$ CFU per gram of composition or per dose, optionally between $10^8$ and $10^{12}$ CFU per dose, e.g. $10^{10}$ CFU per dose.

Embodiment 15: A method as in embodiment 3, wherein the *Lactobacillus plantarum* is at least one bacterial strain selected from the group consisting of *Lactobacillus plantarum* strain LP12418, deposited as DSM 32655, and *Lactobacillus plantarum* strain LP12407, deposited as DSM 32654.

Embodiment 16: A composition comprising *Lactobacillus paracasei* (e.g. strain Lpc-37 deposited with the DSMZ under deposit number DSM 32661), for preventing or treating anxiety.

Embodiment 17: A composition comprising *Lactobacillus paracasei* (e.g. strain Lpc-37 deposited with the DSMZ under deposit number DSM 32661), for preventing or treating depression.

Embodiment 18: A composition comprising *Lactobacillus paracasei* (e.g. strain Lpc-37 deposited with the DSMZ under deposit number DSM 32661), for preventing or treating mood swings.

Embodiment 19: A composition comprising *Lactobacillus paracasei* (e.g. strain Lpc-37 deposited with the DSMZ under deposit number DSM 32661), for preventing or treating memory loss or diminished cognitive function.

Embodiment 20: A composition comprising *Lactobacillus paracasei* (e.g. strain Lpc-37 deposited with the DSMZ under deposit number DSM 32661), for preventing or treating a condition associated with chronic stress, e.g. IBS.

EXAMPLES

The following examples are provided in order to demonstrate and further illustrate specific embodiments and aspects of the present invention and are not to be construed as limiting the scope thereof.

Example 1; Initial Screening of Candidate Strains

Multiple probiotic candidates were initially screened for probiotic characteristics, safety and manufacturing performance. Most of these candidates were discarded due to poor performance. Efficacy testing was conducted on the remaining candidates and from these, 5 strains were selected for further experimental testing, as reported in the examples below.

Example 2; Materials and Methods—General

Animals

Male Swiss mice, 5 weeks old and weighing 30-35 g, from JANVIER (Saint Berthevin, France), were used, and experiments took place at Amylgen (Direction Régionale de l'Alimentation, de l'Agriculture et de la Forêt du Languedoc-Roussillon). Animals were housed in groups of six mice with access to food and water ad libitum, except during behavioural experiments. Each cage contained mice from a single treatment group. They were kept in a temperature and humidity controlled animal facility on a 12-hour light/dark cycle (lights off at 07:00 pm). All animal procedures were conducted in strict adherence to the European Union directive of Sep. 22, 2010 (2010/63/µE).

Bacterial Strain Formulation and Administration

The bacterial strains were solubilized in 0.9% NaCl and administered orally by gavage (100 µL per mouse) at 9:00 a.m. each morning, corresponding to a dose of $10^9$ CFU/day per mouse. Vehicle mice received 0.9% NaCl without bacterial strains. The duration of the treatment was 33 days in total.

Chronic Stress Procedure

The chronic stress procedure was carried out as previously described (Espallergues et al., Psychoneuroendocrinology, 2009). Mice were repeatedly placed in Plexiglas transparent restraint tubes (12 cm length, 3 cm diameter) under bright light for a period of 180 min per day (11:00 a.m. to 2:00 p.m.), for 5 consecutive days per week, over three weeks. Control group animals (No stress mice/Vehicle) were never placed in restraint tubes and remained undisturbed during the stress procedure in a room different from the one where stress was taking place.

Randomisation of the Animals

In each cage (N=6), animals received the same treatment. Treatments and stress procedure were performed in a random manner by an experimenter not involved in the behavioural and biochemical experiments. The behavioural procedures were conducted by a second different experimenter.

Schedule of Experimental Procedures

On day 01, animals were randomly assigned to an experimental group, weighed and treated with the appropriate strain or vehicle.

From day 01 to day 33, animals were treated with appropriate strain or vehicle

From day 08 to day 28, animals were submitted to chronic stress, 3 hours per day, five days per week from Monday to Friday, in accordance with the chronic stress procedure described above.

On day 29, animals performed the elevated plus maze procedure.

On day 30, animals performed the open field procedure, which was also habituation to the day 31-32 tasks.

From day 30 to day 32, animals performed the object recognition memory task

On day 33, animals performed the forced swimming test.

On day 36, animals were euthanised. Blood plasma samples were collected from each animal. Adrenals were collected and weighed.

During the treatment period, acute or delayed mortality was checked every day.

Endpoint Measurements

Elevated plus maze: On day 29, the anxious state of mice was measured by evaluating their ability to explore open and enclosed arms of an elevated plus maze. The clear plexiglass apparatus consisted of two open arms (23.5×8 cm) and two enclosed arms (23.5×8×20 cm high), extending from a central platform and placed 50 cm above the floor. Each mouse was placed at the center of the plus maze facing a closed arm and its exploration behaviour was recorded by Ethovision® XT 9.0 (Noldus Information Technology) for 10 min. The results were expressed as locomotor activity, time spent in the open arms, and number of open arm entries. The gravity center of animal was considered by Ethovision® XT 9.0 software to calculate the position of the animal in the elevated plus maze.

Open field: On day 30, mice were placed individually in a squared open-field (50 cm 15×50 cm×50 cm high) made from white plexiglass with a floor equipped with infrared light emitting diodes. Mice were habituated to the open-field for 10 minutes and their locomotor activity captured through an IR-sensitive camera and analysed using the Ethovision® XT 9.0 software (Noldus Information Technology). Behaviour was analysed as locomotor activity (distance traveled, cm), locomotor activity in the 25 20×25 cm central area defined by the software, and number of stereotypies (sum of the number of rearing and grooming episodes) presented by the mice.

Novel object recognition: On day 31, two identical objects (50 ml plastic vials with caps) were placed at defined positions (position #1 and position #2,at two opposite edges of the central area) of the open-field plexiglass arena. Each mouse was placed in the open-field and the exploratory activity recorded during a 10-min duration session. The activity was analysed using the nose tracking protocol, in terms of number of contacts with objects and duration of contacts. The results are expressed as percentage of object interactions and percentage of the total interaction duration with the object in position #2.

On day 32, the object in position #2 was replaced by a novel one differing in color shape and texture from the familiar object. Each mouse was placed again in the open-field and the exploratory activity recorded during a 10-min duration session. The activity was analysed similarly. The preferential exploration index was calculated as the ratio of the number (or duration) of contacts with the object in position #2 over the total number and duration of contacts with the two objects. Animals showing less than 10 contacts with objects during the sessions were discarded from the study.

Forced swim test: Behavioural despair, a measure of susceptibility to depression, was assessed using the forced swim test. Each mouse was placed individually in a glass cylinder (diameter 12 cm, height 24 cm) filled with water at a height of 12 cm. Water temperature was maintained at 22-23° C. The animal was forced to swim for 6-min. The session was recorded by a CCD camera connected to a computer and movements were analysed using Ethovision® XT 9.0 software (Noldus Information Technology). Two levels of pixel changes were analysed to discriminate between immobility, struggling, and swimming. Analyses were performed min per min the last five minutes of the procedure.

Collection of brain samples: In example 3 below, brain samples are taken following euthanasia (see below). Brains were collected and dissected out on a cold plate. The hippocampus and frontal cortex were divided in two halves, dissected out and frozen on dry ice, then stored at minus 80° C. BDNF levels were measured in one half of the hippocampus.

Measurements of stress hormone release: In many species, including in rodents, corticosterone is the principle glucocorticoid involved in regulation of stress responses. In humans, cortisol is the principle glucocorticoid. Mouse plasma corticosterone levels were measured with an enzyme-linked immunosorbent assay (ELISA) from plasma samples. At sacrifice, whole blood was collected in 2 ml EDTA microtubes (ref. 061666100, Sarstedt), and immediately centrifuged at 3,000 g for 15 min in a refrigerated centrifuge at +4° C. Plasma was carefully collected and transferred to new Eppendorf tubes using a Pasteur pipette to constitute two equivalent volume aliquots. The samples were maintained at 4° C. in ice during handling, then stored at −20° C. until analysis. Plasma corticosterone was assayed with a colorimetric kit (Corticosterone (CSCI) ELISA kit, ab108821, Abcam, France) from a 25-µl sample. Mouse plasma samples were diluted 1:200 in 1× diluent M, and directly assayed according to manufacturer's instructions. The intra- and inter-assay coefficients of variation are routinely 5% and 7%, respectively. The sensitivity of the assay is routinely 0.3 ng/ml for corticosterone. Samples were assayed in duplicate. Plasma ACTH was assayed with a colorimetric kit (ACTH ELISA kit, ENZ-KIT 138, Enzo Life Science, France) in a 25-µl sample. Mouse plasma samples were diluted in 1:1 1× diluent M, and directly assayed according to manufacturer's instructions. BDNF content measurement was performed on hippocampus samples. After thawing, the hippocampal tissue was homogenised in 50 mM Tris-150 mM NaCl buffer, pH 7.5, and sonicated for 20 seconds. After centrifugation, (16,100 g for 15 minutes at 4° C.), supernatants were used in a BDNF ELISA according to the manufacturer's instructions (Promega, #7610). Absorbance was read at 450 nm and sample concentration was calculated using the standard curve. ACTH and BDNF were both analyzed in singlets due to low sample volume, and therefore, data were analyzed for outliers with the ROUT method. Three outliers were identified for each outcome and removed from analysis.

Body weight and adrenal weight: To evaluate long-term stress hormone release, adrenals were dissected at sacrifice and weighed. Results were expressed as ratio of adrenals/body weight.

Statistical analysis: Values were expressed as mean±Standard Error of Mean (SEM). Statistical analyses were performed using Prism 5.0a (GraphPad Software, Inc.) on the different conditions depending on results from Shapiro-Wilk normality test:

With a one-way ANOVA (F value), followed by the Dunnett's post-hoc multiple comparison test to compare individual groups to each other, if data followed a Gaussian distribution.

With a Kruskal-Wallis non-parametric ANOVA (H value), followed by a Dunn's multiple comparison test if data did not follow a Gaussian distribution.

$p<0.05$ was considered to be statistically significant.

Example 3; Study AM306.2 Characterisation of the Effect of Three Selected Strains (Lpc-37, Strain L and Strain B) on Repeated Stress in Mice Study Protocol Sixty Swiss mice (30 to 35 g) were used in this study. Five animal groups were constituted in the following manner, according to Table 1 below.

TABLE 1

Treatment groups in Study AM306.2

| | n |
|---|---|
| 1. No stress male mice/Vehicle | 12 |
| 2. Chronic stressed male mice/Vehicle | 12 |
| 3. Chronic stressed male mice/*Lactobacillus paracasei*, Lpc-37, $10^9$ CFU/day | 12 |
| 4. Chronic stressed male mice/*Lactobacillus* strain (referred to herein as strain L), $10^9$ CFU/day | 12 |
| 5. Chronic stress male mice/*Bifidobacterium* strain (referred to herein as strain B), $10^9$ CFU/day | 12 |
| Total mice | 60 |

Animals were randomly assigned to an experimental group, weighed and treated with the appropriate strain/vehicle in accordance with the methods set out in Example 2 above. From day 01 to day 33, animals were treated in accordance with the treatment schedule described in Example 2 above.

Results and Comments

Animals weight; FIG. 1 shows the effects of chronic stress on body weight in mice. Chronic stress induced a non-significant difference of body weight from day 18 to day 32 of the study as compared to the no stress/vehicle treated group. Individual treatments with the selected bacterial strains (Lpc-37, Strain L or Strain B) showed no effect on this parameter.

Figure 2:
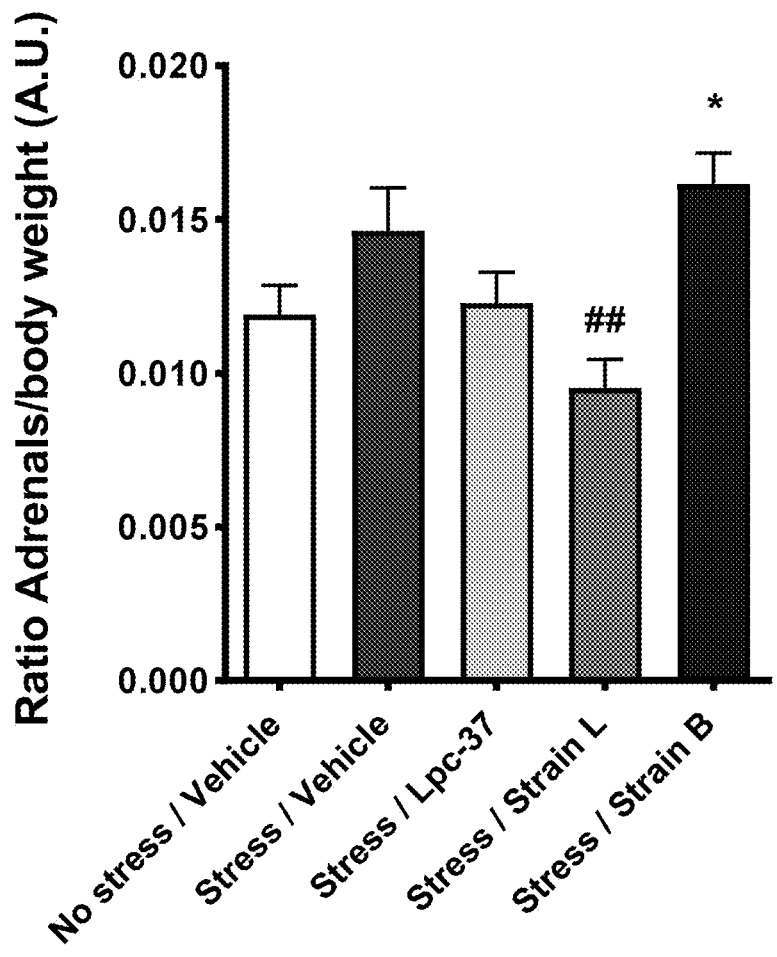
FIG. 2. Effect of 3 weeks of chronic stress on the adrenal weight/body weight ratio in mice, in groups treated with vehicle alone or a selected bacterial strain. N=12 for all groups except for group treated with Lpc-37 where N=11. Statistical Analyses: One-way ANOVA; Adrenal Weight: $F_{(4,58)}$=5.820, p=0.0006; Pairwise comparisons: *p<0.05 vs non-stress/vehicle group, ##p<0.01 vs chronic stress/vehicle group (Dunnett's test)

Adrenal weight; FIG. 2 shows the effect of chronic stress on the adrenal weight/body weight ratio in mice. Chronic stress showed no significant effect on the adrenal weight/body weight ratio. Treatment of mice with Strain B significantly increased the adrenal weight/body weight ratio compared to the no stress/vehicle group. Conversely, treatment with Strain L significantly reduced the adrenal weight/body weight ratio compared to the no stress/vehicle group.

Figure 3:
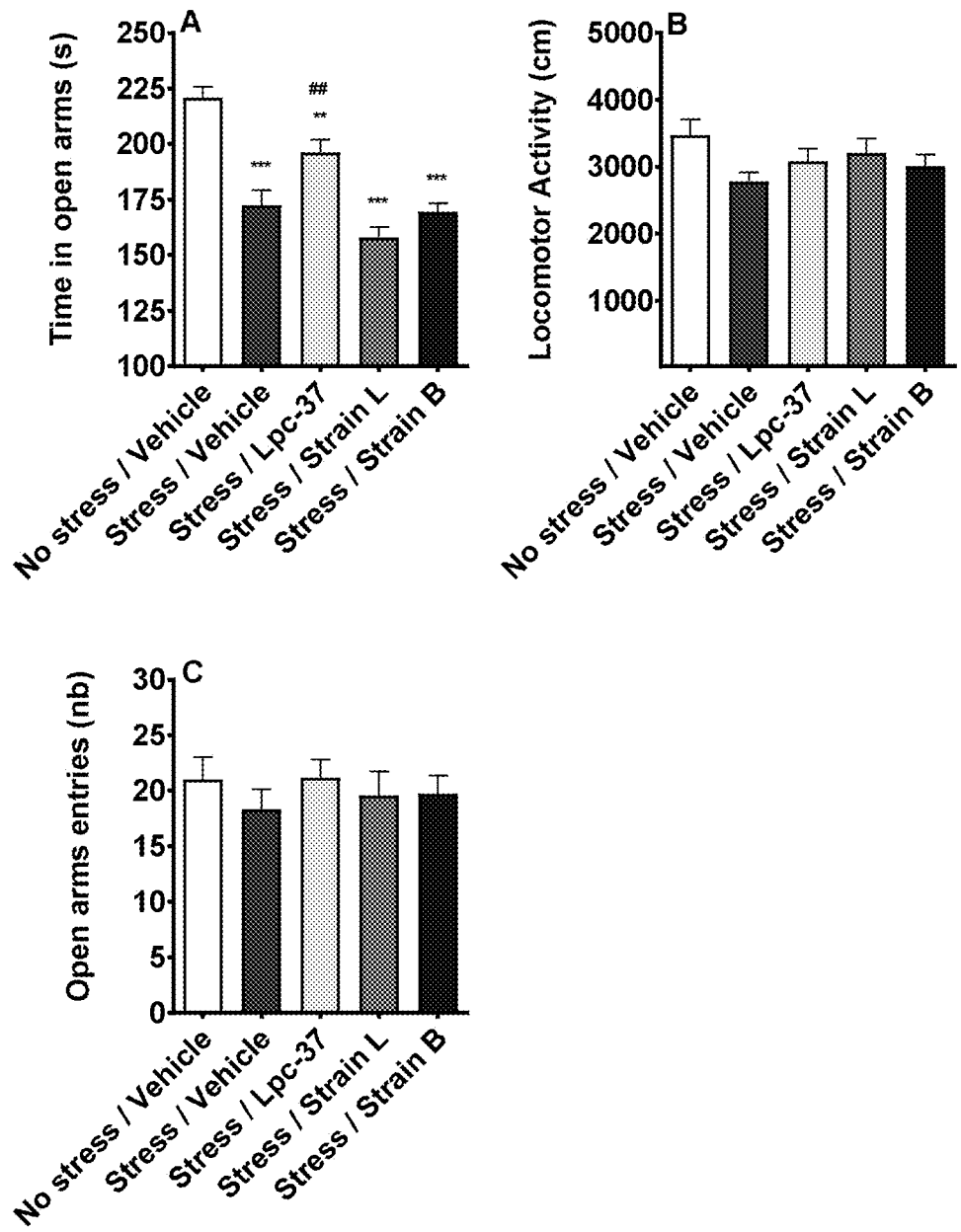
FIG. 3. Effect of treatment with selected bacterial strains on chronic stress-induced anxiety in mice. N=12 for all groups except for group treated with Lpc-37 where N=11. Statistical Analyses: One-way ANOVA; Time in open arms: $F_{(4,58)}$=23.72, p<0.0001; Locomotor activity: $F_{(4,58)}$=0.1612, p>0.05; Open arm entries: $F_{(4,58)}$=0.8161, p<0.05; Pairwise comparisons: p<0.01, *p<0.001 vs the non-stress/vehicle group, ##p<0.01 vs chronic stress/vehicle group (Dunnett's test)

Anxiety measurement in the elevated-plus maze procedure; The effects of treatment on anxiety are illustrated in the results observed in the elevated plus maze procedure. As seen in FIG. 3, stressed mice showed a very significant anxiety-like behaviour, reflected by a reduction of the time spent in open arms (A). Lpc-37 treatment very significantly but partially alleviated this deficit. Treatment of mice with either Strain L or Strain B were ineffective at alleviating this deficit. Animal groups showed no difference in terms of locomotor activity (B) or number of open arm entries (C).

Figure 4:
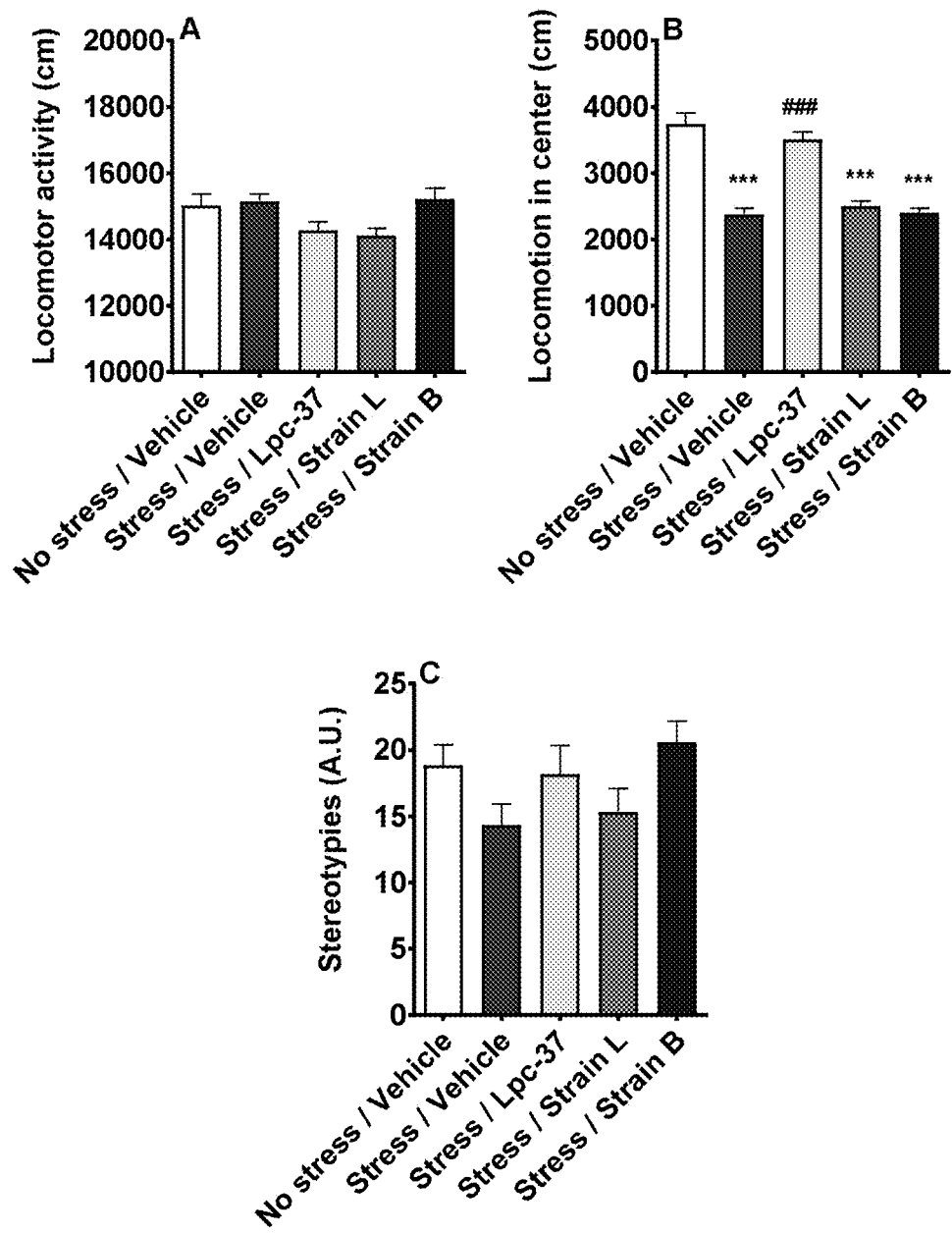
FIG. 4. Effect of treatment with selected bacterial strains on chronic stress-induced anxiety in mice in the open field procedure. Three parameters were measured; locomotor activity (A), locomotion in the centre of the area (B), and rearing/grooming behaviour (stereotypies C). For stereotypies, data were represented as arbitrary units (A.U.) corresponding to the number of rearings plus the number of groomings during 10 minutes of open field procedure. N=12 for all groups except group treated with Lpc-37, where N=11. Statistical analyses: One-way ANOVA; Locomotor activity: $F_{(4,58)}$=3.433, p=0.0143; Locomotion in the centre: $F_{(4,58)}$=37.28, p<0.0001; Stereotypes: $F_{(4,58)}$=2.227, p<0.05; Pairwise comparisons: ***p<0.001 vs. the non-stress/vehicle group, ###p<0.001 vs the chronic stress/vehicle group (Dunnett's test)

Anxiety in the open field procedure; FIG. 4 shows the effects of the different treatments on chronic stress-induced anxiety in mice. As shown in FIG. 4A, neither stress alone, nor any of the treatments, had an observable influence on locomotor activity. However, chronic stress did induce a very significant decrease of locomotion in the center of the arena; an indication that chronic stress induced an anxiety like behaviour (FIG. 4B). Furthermore, Lpc-37 treatment very significantly and fully alleviated this deficit. Other treatments appeared to be ineffective at alleviating this anxiety-like behaviour. Neither chronic stress alone nor any of the treatments showed any influence on the rearing/grooming behaviour, related to stereotypic activity (FIG. 4C).

Figure 5:
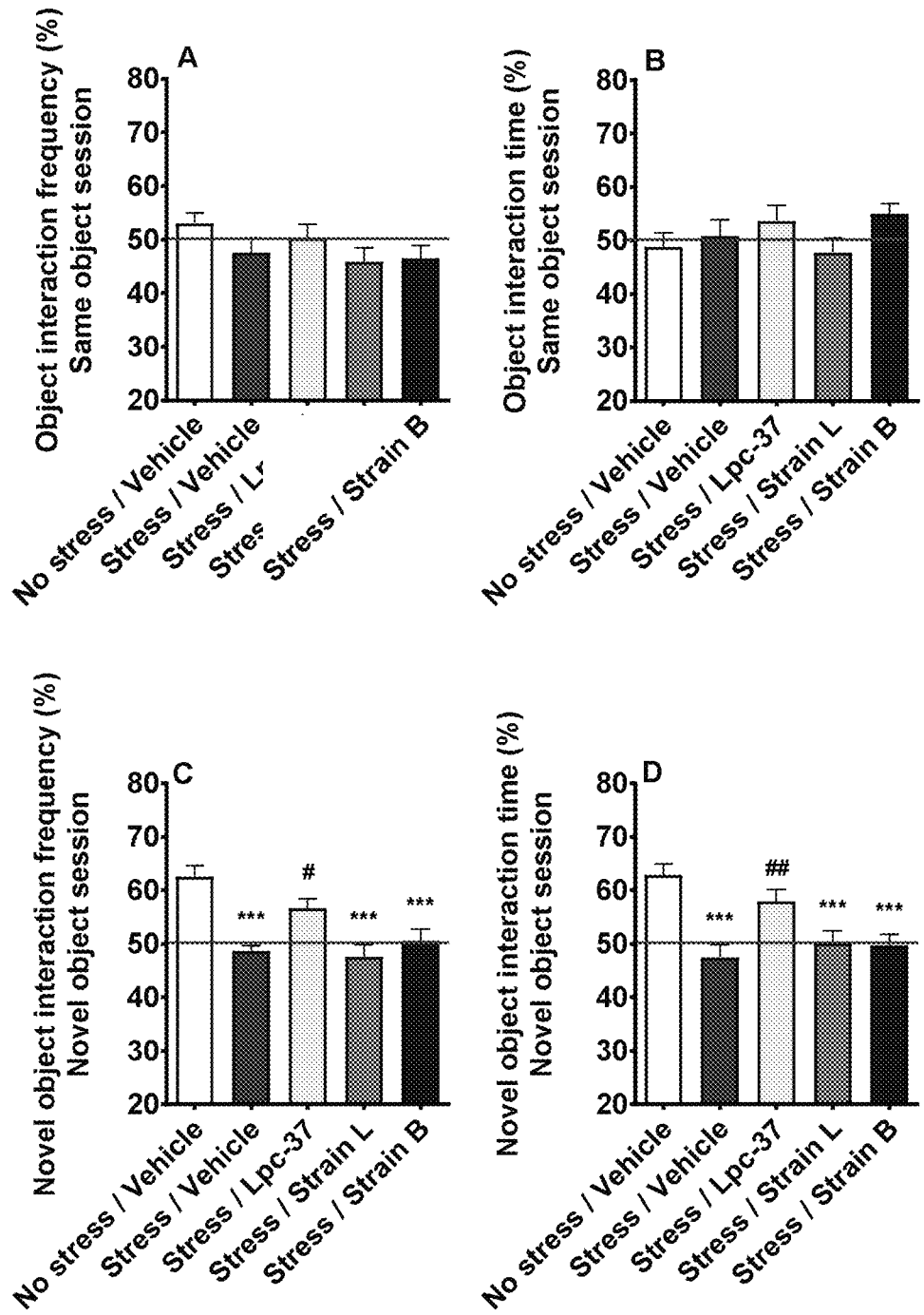
FIG. 5. Effect of treatment with selected bacterial strains on chronic stress-induced recognition memory deficits in mice. Parameters measured included object interaction frequency (A, C) and object interaction time (B, D), for same object recognition (A, B) and novel object recognition (C, D). N=12 for all groups except group treated with Lpc-37, where N=11. Statistical analyses: One-way ANOVA; Day 2 Same object frequency: $F_{(4,58)}$=1.460, p>0.05; Day 2 Same object time: $F_{(4,58)}$=1.327, p>0.05; Day 3 Novel object frequency: $F_{(4,58)}$=10.48, p<0.001; Day 3 Novel object time: $F_{(4,58)}$=8.881, p<0.001; Pairwise comparisons: ***p<0.001 vs. the non-stress/vehicle group, #p<0.05, ##p<0.01 vs the chronic stress/vehicle group (Dunnett's test).

Recognition memory in the novel object recognition procedure; FIG. 5 shows the effects of the different treatments on chronic-stress induced recognition memory in mice. Neither chronic stress alone, nor any of the treatments, showed an influence on object exploration during the session at day 2 with two identical objects, either in terms of frequency of contact (A) or in terms of time spent to explore the 2 objects (B). However, chronic stress induced recognition memory deficits during the novel object session by decreasing the frequency of interaction with the novel object (C) and the time of interaction with the novel object (D). Lpc-37 treatment very significantly and fully alleviated this deficit. Other treatments appeared to be ineffective.

Figure 6:
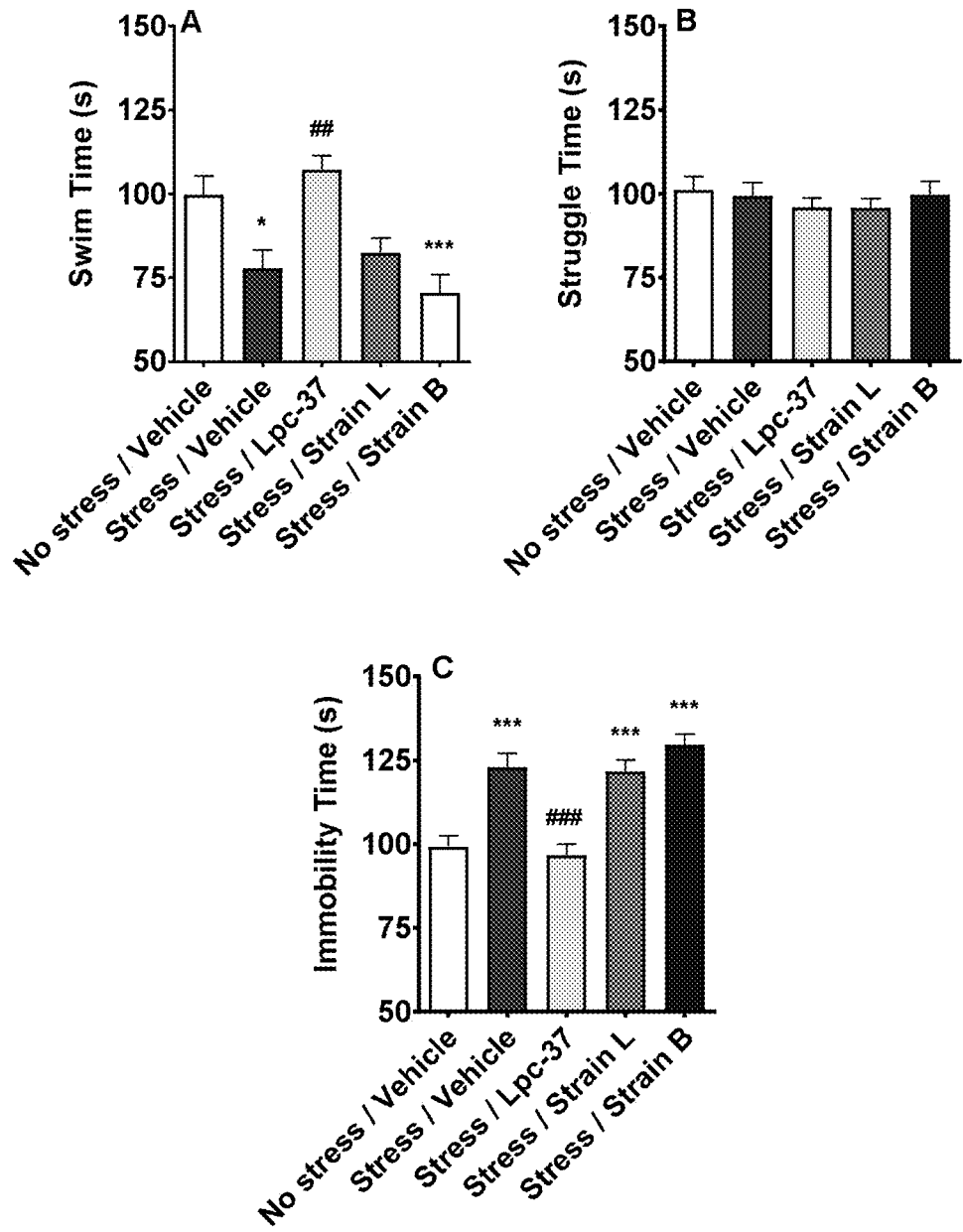
FIG. 6. Effect of treatment with selected bacterial strains on chronic stress-induced behavioural despair in mice as measured in the forced swim test. Three parameters were measured; immobility time (A), struggle time (B) and swim time (C). N=12 for all groups except group treated with Lpc-37, where N=11. Statistical analyses: One-way ANOVA; Immobility time: $F_{(4,58)}$=18.14, p<0.0001; Struggle time: $F_{(4,58)}$=0.4328, p>0.05; Swim time: $F_{(4,58)}$=8.931, p<0.0001; Pairwise comparisons: *p<0.05, ***p<0.001 vs the non-stressed/vehicle group, ##p<0.01, ###p<0.001 vs the chronic stress/vehicle group (Dunnett's test).

Forced swim test; FIG. 6 shows the effects of chronic stress and the various treatments on chronic stress-induced behavioural despair in mice. The forced swim test was used to measure three different parameters; immobility time (parameter A), struggle time (parameter B) and swim time (parameter C). Chronic stress induced an increase of immobility in the forced swim test (FIG. 6A). Chronic stress also reduced swim time compared to the no stress/vehicle group (FIG. 6C). Lpc-37 treatment very significantly alleviated these effects resulting in immobility and swim time values comparable to that of the no stress/vehicle group. Other treatments did not appear to be effective in alleviating these effects. In terms of struggle time, neither chronic stress nor any of the various treatments appeared to influence this parameter compared to the no stress/vehicle group (FIG. 6B).

Figure 7:
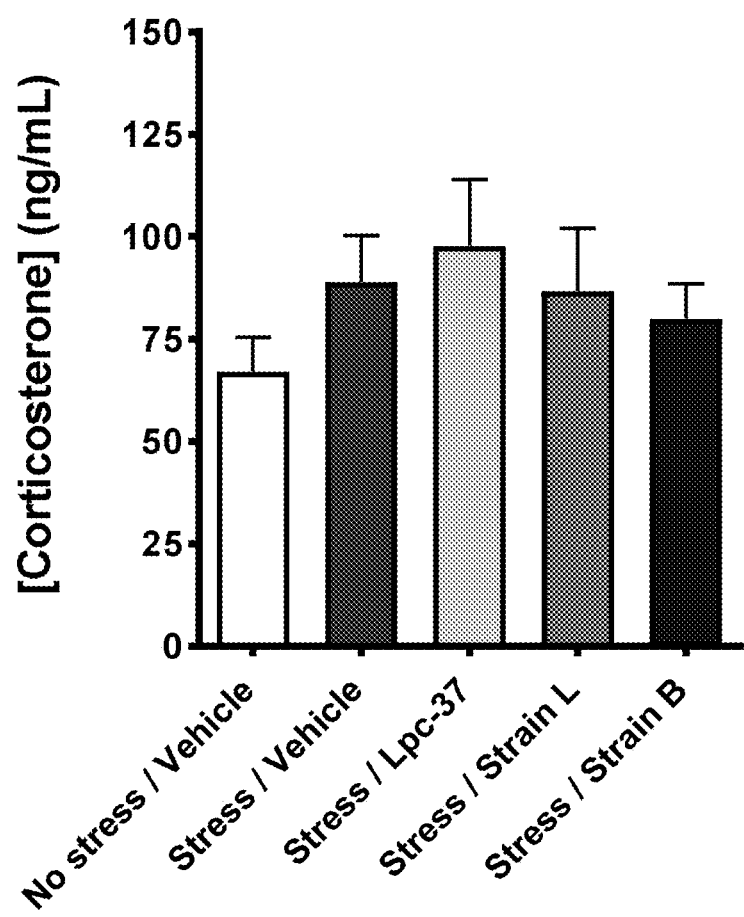
FIG. 7. Effect of chronic stress and treatment with selected bacterial strains on plasma corticosterone concentrations. N=12 for all groups except group treated with Lpc-37, where N=11. Statistical analyses: One-way ANOVA; Corticosterone concentration: $F_{(4,58)}$=0.8513, p>0.05.

Corticosterone contents measurement by ELISA; FIG. 7 displays blood plasma corticosterone concentration for each of the treatment groups at day 36. Chronic stress produced a non-significant elevation of plasma corticosterone concentration in mice after the forced swim test, that did not reach statistical significance. Treatments showed no significant effect on this parameter in this study.

General conclusions from AM306.2 study; The following conclusions can be drawn from the results described above.
Chronic stress induced behavioural deficits:
  Induced a much lower increase of body weight of mice compared to non-stress mice, however, this differed did not reach statistical significance
  Showed no significance effect on the adrenal weight/body weight ratio under the conditions tested
  Induced an anxiety-like state in mice in open-field test and in elevated plus maze test.
  Showed a very significant recognition long-term memory deficit in mice as compared to non-stressed mice.
  Showed no significant effect on blood plasma corticosterone levels under the conditions tested.
Treatment with *L. paracasei* Lpc-37:
  Very significantly but partially alleviated the anxiety increase induced by chronic stress in the elevated plus maze test.
  Very significantly and fully alleviated the anxiety increase induced by chronic stress in the open-field procedure.
  Very significantly and fully alleviated the behavioural despair induced by chronic stress in the forced swim test Showed no effect on plasma corticosterone levels under the conditions tested.

Treatment with either Strain L or Strain B had no significant effect on any chronic stress-induced behavioural or biochemical test parameters.

Example 4; Study AM306.5 Characterisation of the Effect of Three Selected Strains (Lpc-37, LP12418 and LP12407) on Repeated Stress in Mice Study Protocol Seventy-Two Swiss mice (30 to 35 g) were used in this study. Five animal groups were constituted in the following manner, according to Table 2 below.

TABLE 2

Treatment groups in Study AM306.5

|  | n | n* |
|---|---|---|
| 1. No stress male mice/Vehicle | 12 | 6* |
| 2. Chronic stressed male mice/Vehicle | 12 | 6* |
| 3. Chronic stressed male mice/*Lactobacillus paracasei*, Lpc-37, $10^9$ CFU/day | 12 |  |
| 4. Chronic stressed male mice/*Lactobacillus plantarum*, LP12418, $10^9$ CFU/day | * | 12* |
| 5. Chronic stress male mice/*Lactobacillus plantarum*, LP12407, $10^9$ CFU/day | 12 |  |
| Total mice | 48 | 24 |

*Due to an unexpected mortality in Group 4 caused by aggressive behaviour in on cage, the 12 planned animals were discarded and this group was planned with an additional six animals per control group in a second session of experiments.

Animals were randomly assigned to an experimental group, weighed and treated with the appropriate strain/vehicle. From day 01 to day 33, animals were treated in accordance with the treatment schedule described in Example 2 above. In addition, on day 28, blood was sampled and plasma prepared from the samples. Also, following euthanasia, brains were removed and the hippocampus and frontal cortex dissected out and weighed before storing at −80° C. (also in accordance with the methods described in Example 2). Corticosterone, and ACTH levels in the plasma at day 28 were measured. BDNF content was also measured in hippocampus samples following euthanasia of mice.

Results and Comments

Figure 8:
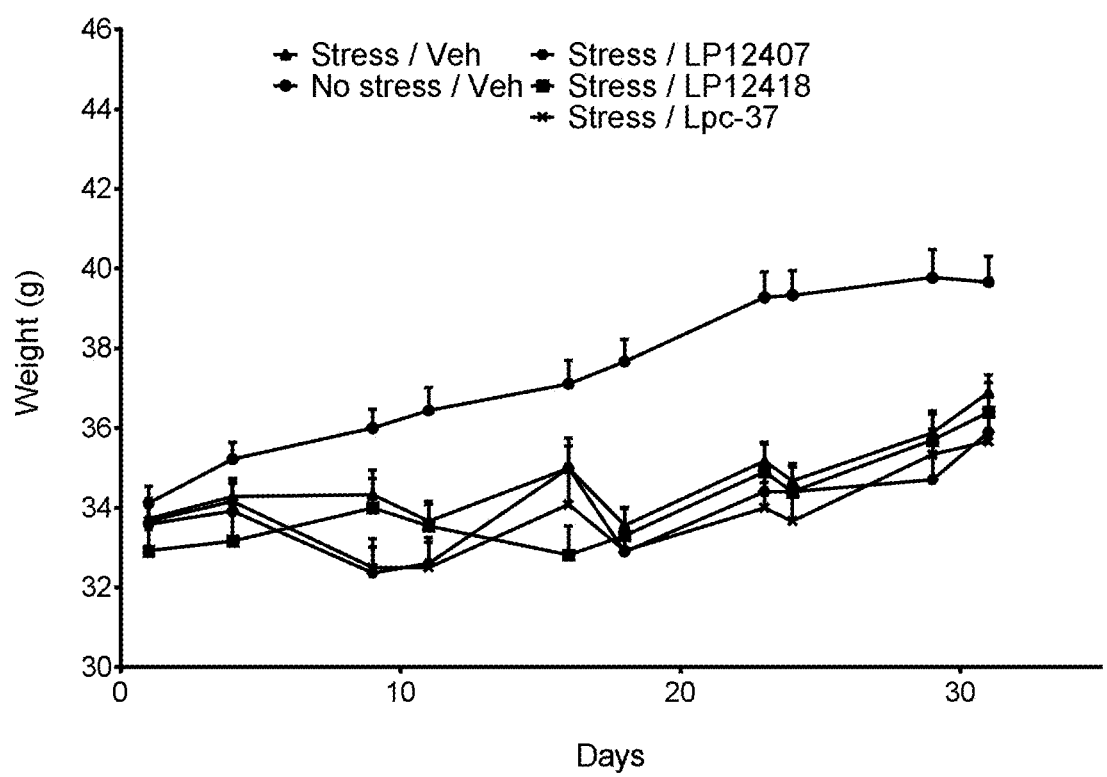
FIG. 8. Effect of 3 weeks of chronic stress on body weight in mice, in groups treated with vehicle alone or a selected bacterial strain. N=12-18 for all groups. Statistical Analyses: Two-way ANOVA; Weight (time): $F_{(9,643)}=17.46$, p<0.0001; Weight (treatment): $F_{(4,643)}=74.39$, p<0.0001.

Animals weight; FIG. 8 shows the effects of chronic stress on body weight in mice. Chronic stress induced significant lower increase of body weight from day 18 to day 32 of the study as compared to the no stress/vehicle treated group. Individual treatments with the selected bacterial strains (Lpc-37, LP12418, LP12407) showed no effect on this parameter.

Figure 9:
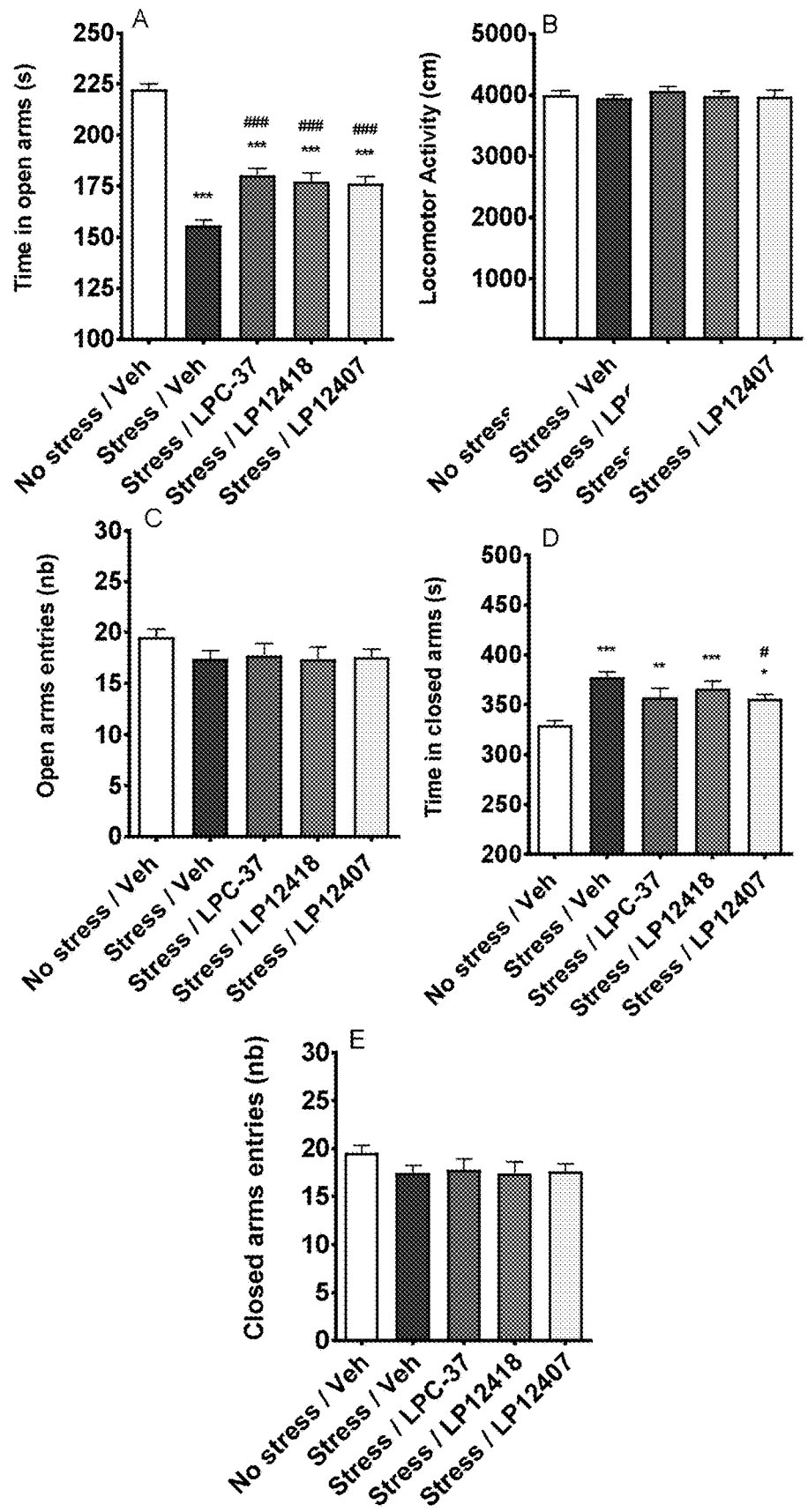
FIG. 9. Effect of treatment with selected bacterial strains on chronic stress-induced anxiety in mice. N=10-18 for all groups. Statistical Analyses: One-way ANOVA; Time in open arms: $F_{(4,67)}=78.92$, p<0.0001; Locomotor activity: $F_{(4,67)}=0.3718$, p>0.05; Open arm entries: $F_{(4,67)}=1.19$, p>0.05; Time in closed arm: $F_{(4,67)}=10.85$, p<0.0001; Closed arm entries: $F_{(4,67)}=1.19$, p>0.05; Pairwise comparisons: *p<0.05, p<0.01, *p<0.0001 vs the non-stress/vehicle group, #p<0.05, ###p<0.0001 vs. the chronic stress/vehicle group (Dunnett's test).

Anxiety measurement in the elevated plus maze procedure; The effects of treatment on anxiety are illustrated in the results observed in the elevated plus maze procedure. As seen in FIG. 9, stressed mice showed a very significant anxiety-like behaviour, reflected by a reduction of the time spent in open arms (A). Treatment with Lpc-37, LP12418 or LP12407 strains very significantly but partially increased the time spent in open arms (partially alleviating the reduction observed in chronically stressed mice treated with vehicle alone). Animal groups showed no difference in terms of locomotor activity (B) or number of open arm entries (C).

Figure 10:
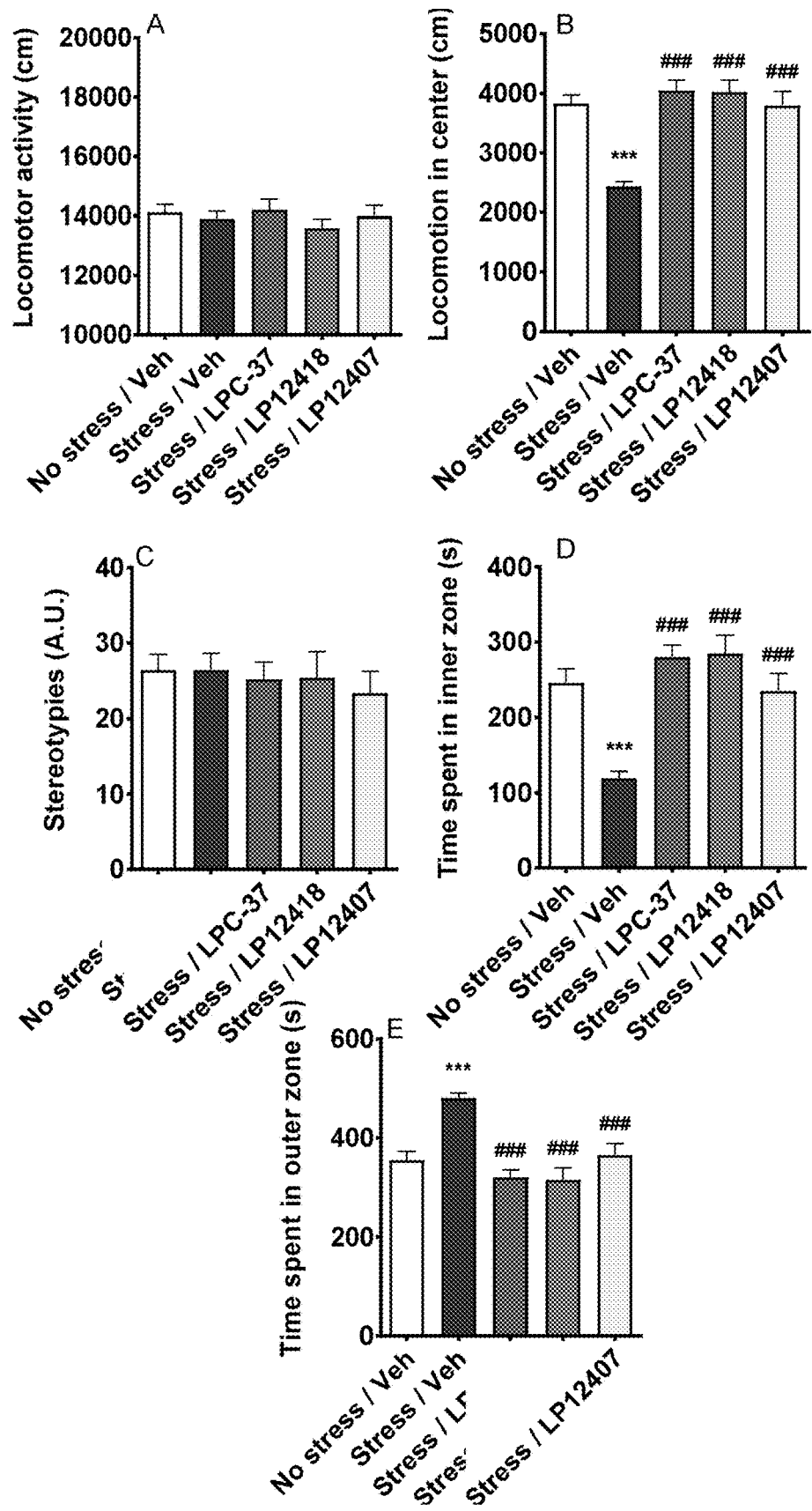
FIG. 10. Effect of treatment with selected bacterial strains on chronic stress-induced anxiety in mice in the open field procedure. Five parameters were measured; locomotor activity (A), locomotion in the centre of the area (B), rearing/grooming behaviour (stereotypies C), time spent in inner zone(s) (D), and time spent in outer zone(s) (E). For stereotypies, data were represented as arbitrary unit (A.U.) corresponding to the number of rearings plus the number of groomings during 10 minutes of open field procedure. N=10-18 for all groups. Statistical analyses: One-way ANOVA; Locomotor activity: $F_{(4,67)}=0.4977$, p>0.05; Locomotion in the centre: $F_{(4,67)}=21.5$, p<0.0001; Stereotypes: $F_{(4.67)}=0.2328$, p>0.05; Time spent in inner zone: $F_{(4.67)}=16.42$, p<0.0001; Time spent in outer zone: $F_{(4.67)}=16.42$, p<0.0001; Pairwise comparisons: ***p<0.001 vs. the non-stress/vehicle group, ###p<0.001 vs the chronic stress/vehicle group (Dunnett's test).

Anxiety in the open field procedure; FIG. 10 shows the effects of the different treatments on chronic stress-induced anxiety in mice. As shown in FIG. 10A, neither stress alone, nor any of the treatments, had an observable influence on locomotor activity. However, chronic stress did induce a very significant decrease of locomotion in the center of the arena; an indication that chronic stress induced an anxiety-like behaviour (FIG. 10B). Furthermore, treatment with Lpc-37, LP12418 or LP12407 strains very significantly and fully alleviated this deficit. Chronic stress also induced a significant decrease in time spent in the inner zone(s) (D) and significantly reduced time spent in the outer zone(s) (E). Treatments with Lpc-37, LP12418 or LP12407 alleviated these stress-induced responses, restoring times spent in the inner and outer zone (s) to levels comparable to the no stress/vehicle group. Neither chronic stress alone nor any of the treatments showed any influence on the rearing/grooming behaviour, related to stereotypic activity (FIG. 10C).

Figure 11:
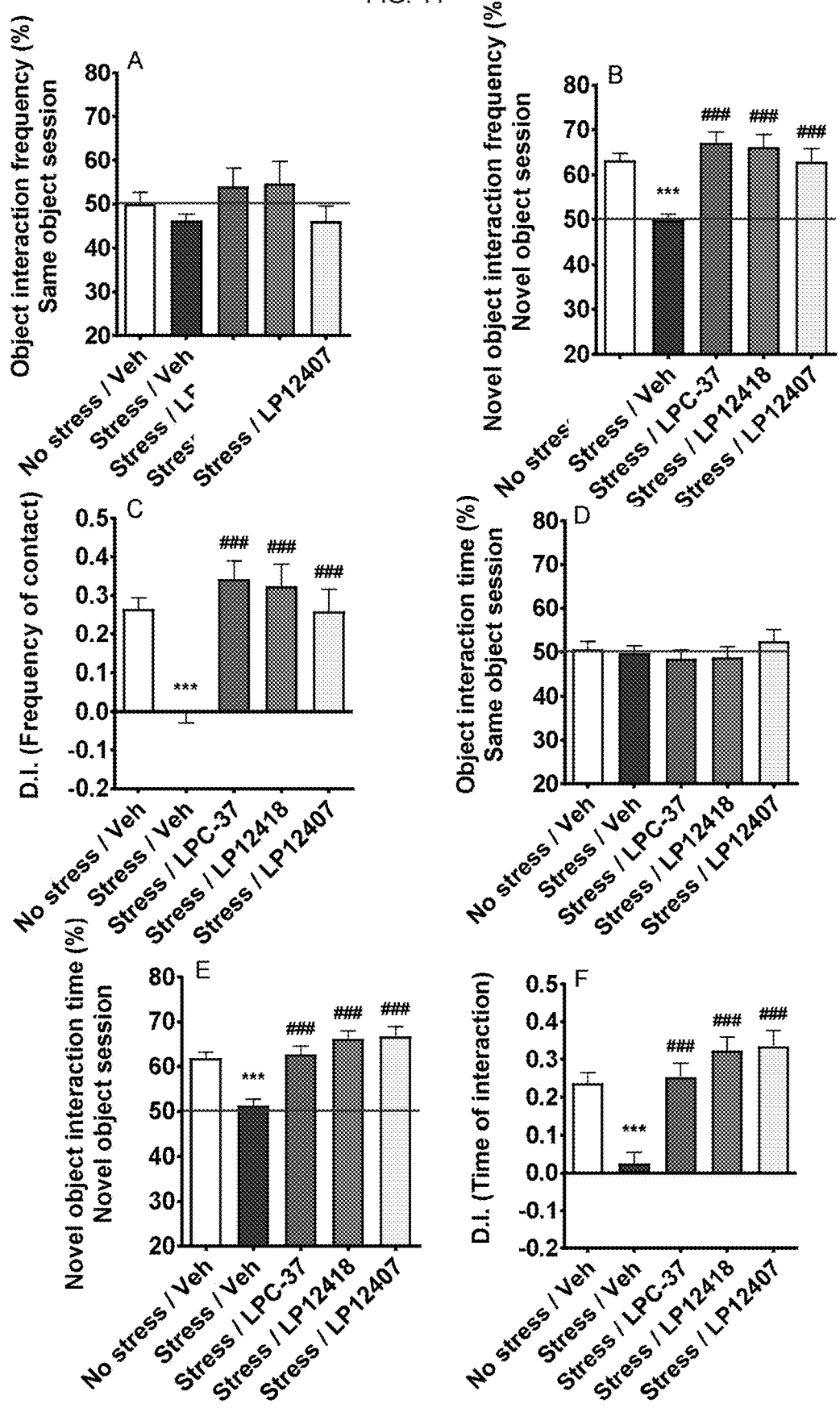
FIG. 11. Effect of treatment with selected bacterial strains on chronic stress-induced recognition memory deficits in mice. Parameters measured included object interaction frequency (A, B) and object interaction time (D, E), for same object recognition (A, D) and novel object recognition (B, E). The discrimination index for the novel object (DI) as the difference of interaction frequency (C) and interaction time (F) mice spent investigating between the novel and the familiar object divided by the total frequency and time exploring both objects. [Discrimination Index, DI=(Novel Object Exploration frequency/time−Familiar Object Exploration frequency/time)/(Novel Object Exploration frequency/time+Familiar Object Exploration frequency/time)]. N=10-18 for all groups. Statistical analyses: One-way ANOVA; Day 2 Same object frequency: $F_{(4,59)}=1.54$, p>0.05; Day 2 Same object time: $F_{(4,59)}=0.5006$, p>0.05; Day 3 Novel object frequency: $F_{(4,59)}=14.18$, p<0.001; Day 3 Novel object time: $F_{(4,59)}=15.02$, p<0.001; Discrimination index frequency: $F_{(4,59)}=14.18$, p<0.0001, Discrimination index time: $F_{(4,59)}=15.02$, p<0.0001; Pairwise comparisons: ***p<0.001 vs. the non-stress/vehicle group, #p<0.001 vs the chronic stress/vehicle group (Dunnett's test).

Recognition memory in the novel object recognition procedure; FIG. 11 shows the effects of the different treatments on chronic stress-induced recognition memory in mice. Neither chronic stress alone, nor any of the treatments, showed an influence on object exploration during the session at day 2 with two identical objects, either in terms of frequency of contact (FIG. 11A) or in terms of time spent to explore the 2 objects (FIG. 11D). However, chronic stress induced recognition memory deficits during the novel object session by decreasing the frequency of interaction with the novel object (FIG. 11B) and the time of interaction with the novel object (FIG. 11E). Treatment with either Lpc-37, LP12418 or LP12407 strains very significantly and fully restored the frequency of interaction and the time of interaction, making conclusive the effect of treatment with these strains on novel object recognition. The same profile was observed for the discrimination index (FIGS. 11C and 11F).

Figure 12:
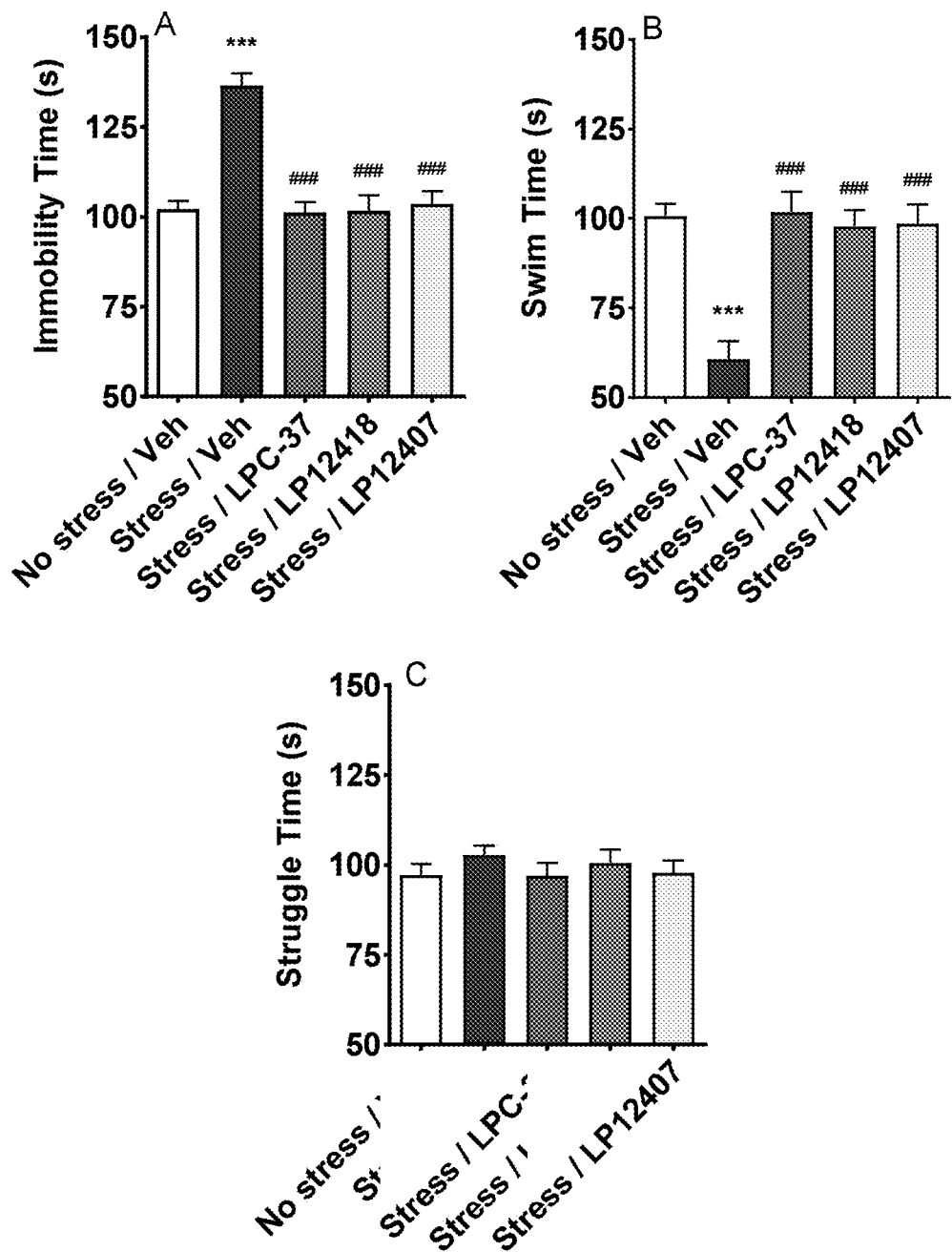
FIG. 12. Effect of treatment with selected bacterial strains on chronic stress-induced behavioural despair in mice as measured in the forced swim test. Three parameters were measured; immobility time (A), swim time (B) and struggle time (C). N=10-18 for all groups. Statistical analyses: One-way ANOVA; Immobility time: $F_{(4,59)}=26.82$, p<0.0001; Swim time: $F_{(4,59)}=15.97$, p<0.0001; Struggle time: $F_{(4,59)}=0.7128$, p>0.05; Pairwise comparisons: ***p<0.0001 vs the non-stressed/vehicle group, ###p<0.0001 vs the chronic stress/vehicle group (Dunnett's test).

Forced swim test; FIG. 12 shows the effects of chronic stress and the various treatments on chronic stress-induced behavioural despair in mice. The forced swim test was used to measure three different parameters; immobility time (parameter A), swim time (parameter B) and struggle time (parameter C). Chronic stress-induced an increase of immobility in the forced swim test (FIG. 12A). Chronic stress also reduced swim time compared to the no stress/vehicle group (FIG. 12B). Treatment with either Lpc-37, LP12418 or LP12407 strains very significantly and fully reversed the effects of stress on immobility time and swim time, resulting in immobility and swim time values comparable to that of the no stress/vehicle group. In terms of struggle time, neither chronic stress nor any of the various treatments appeared to influence this parameter compared to the no stress/vehicle group (FIG. 12C).

Figure 13:
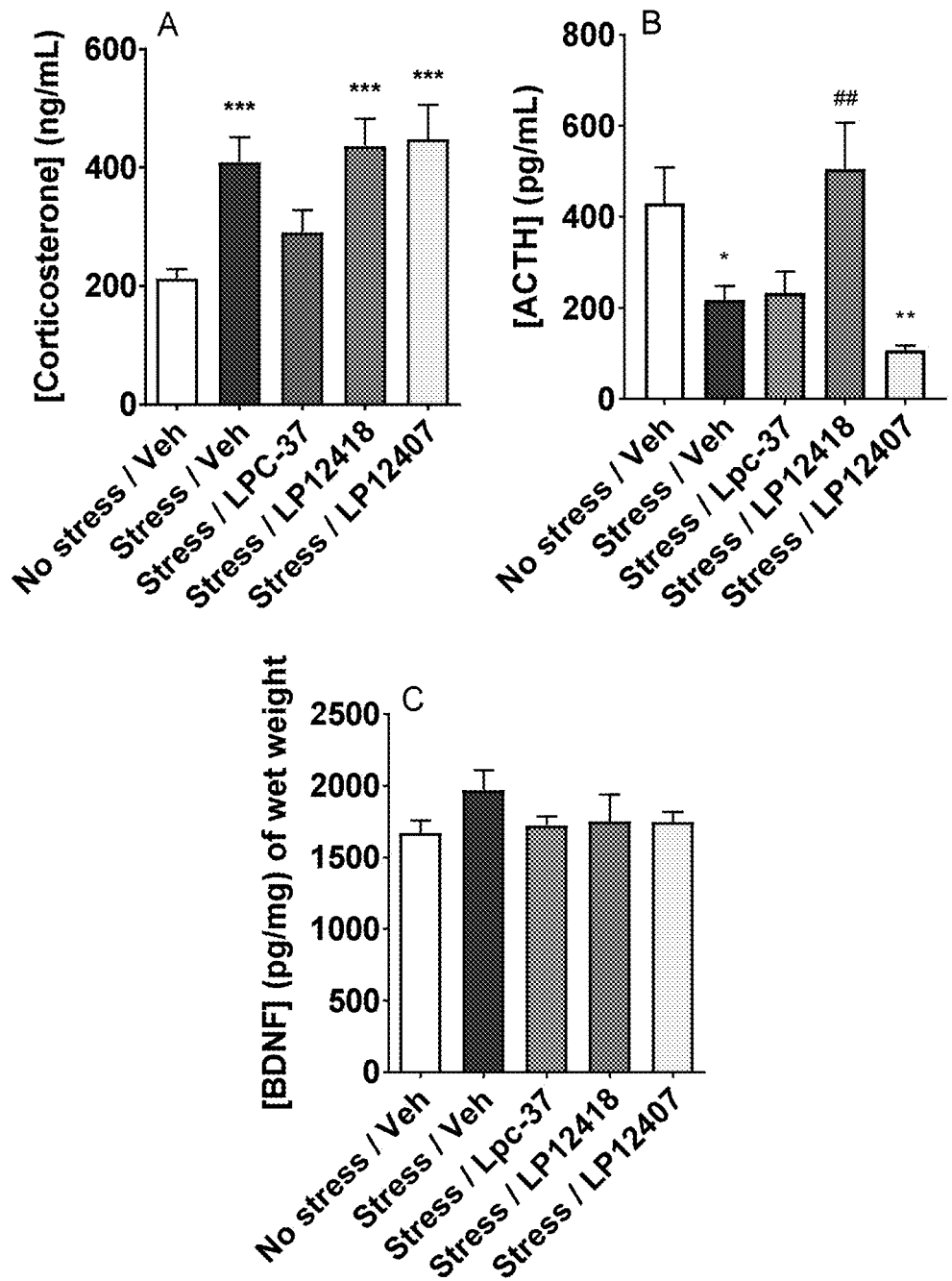
FIG. 13. Effect of chronic stress and treatment with selected bacterial strains on blood plasma corticosterone and adrenocorticotrophic hormone (ACTH) concentration and hippocampus brain-derived neurotrophic factor (BDNF) concentration. N=10-18 for all groups. Statistical analyses: One-way ANOVA; Corticosterone concentration: $F_{(4,67)}=7.592$, p<0.001; ACTH concentration: $F_{(4,67)}=5.75$, p<0.001; BDNF concentration: $F_{(4,67)}=1.23$, p>0.05; Pairwise comparisons: *p<0.05, p<0.01, *p<0.001 vs. the non-stressed/vehicle group, ##p<0.01 vs. the chronic stress/vehicle group (Dunnett's test).

Biochemical marker measurement by ELISA; FIGS. 13A and 13B respectively display blood plasma corticosterone and ACTH concentrations for each of the treatment groups. FIG. 13C displays BDNF concentration in the hippocampus. Chronic stress very significantly increased the corticosterone concentration in mice plasma and significantly decreased the ACTH concentration. A non-significant increase in BDNF concentration was also observed in chronically stressed mice. Mice treated with Lpc-37 did not show a similar increase in blood corticosterone concentration than the chronically stressed group, although they did not significantly differ from either the non-stressed vehicle or chronically stressed vehicle mice. However, Lpc-37 treatment did not appear to affect ACTH concentration. Treatment with LP12418 showed no effect on corticosterone concentration, but very significantly increased ACTH concentration compared to the chronic stress/vehicle group, restoring ACTH concentrations to a level comparable with the no stress/vehicle group. LP12407 treatment showed no difference in corticosterone or ACTH concentration compared to the chronically stressed mice. BDNF concentration was similar across non-stressed vehicle mice and all probiotic-treated chronically stressed mice. Despite the seemingly higher average BDNF concentration in the chronically stressed vehicle mice, there were no statistically significant differences between groups.

General Conclusions from AM306.5 Study

The following conclusions can be drawn from the results described above.

Chronic stress induced behavioural deficits:

Induced a partial body weight decrease as compared to non-stressed mice

Induced an anxiety-like state in mice in open-field test and in elevated plus maze test.

Showed a very significant recognition long-term memory deficit in mice as compared to non-stressed mice.

Showed a significant depressive-like state observed by behavioural despair in the forced swim test paradigm Significantly increased blood plasma corticosterone concentration.

Treatment with wither L. paracasei Lpc-37, L. plantarum LP12418, L. plantarum, or LP12407:

Had no effect on the loss of body weight as compared to chronically stressed mice Very significantly and fully alleviated anxiety-like state in mice in the elevated plus maze test.

Very significantly and fully alleviated anxiety-like state in mice in the open-field procedure.

Very significantly and fully alleviated the recognition long-term memory deficit in mice compared to chronically stressed mice.

Very significantly and fully alleviated the depression-like behaviour observed by a behavioural despair in the forced swim test paradigm, compared to the chronically stressed group treated with vehicle alone Showed differential effect on corticosterone, ACTH and BDNF concentrations.

The invention claimed is:

1. A method for treating a mental illness or symptom affecting mental health in a mammal in need thereof, wherein:

the method comprises administering to the mammal *Lactobacillus paracasei* strain Lpc-37, deposited at the DSMZ under deposit number DSM 32661;

the mental illness is selected from a mood disorder, an anxiety disorder and depression; and the symptom affecting mental health is selected from anxiety, mood swings, depression and reduced cognitive function.

2. The method according to claim 1, wherein the method comprises treating a mental illness selected from a mood disorder, an anxiety disorder and depression.

3. The method according to claim 2, wherein the mental illness results in diminished cognitive function.

4. The method according to claim 1, wherein the method comprises treating a symptom affecting mental health selected from anxiety, mood swings and depression.

5. The method according to claim 1, wherein the method further comprises administering to the mammal bacteria of the *Lactobacillus plantarum* species.

6. The method according to claim 5, wherein the method comprises treating at least one mental illness selected from a mood disorder, an anxiety disorder and depression.

7. The method according to claim 5, wherein the method comprises treating at least one symptom affecting mental health selected from anxiety, mood swings and depression.

8. The method according to claim 5, wherein the bacteria of the species *Lactobacillus plantarum* are:

*Lactobacillus plantarum* strain LP12418, deposited at the DSMZ as DSM 32655, or

*Lactobacillus plantarum* strain LP12407, deposited at the DSMZ as DSM 32654.

9. The method according to claim 1, wherein the *Lactobacillus paracasei* strain Lpc-37 is administered to the mammal as part of a composition in the form of a food product, a dietary supplement or a pharmaceutically acceptable composition.

10. The method according to claim 9, wherein the *Lactobacillus paracasei* strain Lpc-37 is present in the composition in an amount of from $10^6$ to $10^{12}$ CFU per dose.

11. The method according to claim 1, wherein the *Lactobacillus paracasei* strain Lpc-37 is administered to the mammal as part of a spray dried or freeze-dried composition.

12. The method according to claim 11, wherein the composition comprises a cryoprotectant.

13. The method according to claim 1, wherein the method comprises treating a symptom affecting mental health, and the symptom affecting mental health is diminished cognitive function.

* * * * *